(12) United States Patent
Yoshizawa et al.

(10) Patent No.: US 12,282,155 B2
(45) Date of Patent: Apr. 22, 2025

(54) OPTICAL SCANNING DEVICE, DRIVING METHOD OF OPTICAL SCANNING DEVICE, AND IMAGE DRAWING SYSTEM

(71) Applicant: FUJIFILM Corporation, Tokyo (JP)

(72) Inventors: Hirotoshi Yoshizawa, Kanagawa (JP); Shinichiro Sonoda, Kanagawa (JP); Yoshikazu Hishinuma, Kanagawa (JP); Nobuya Tanaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 517 days.

(21) Appl. No.: 17/738,788

(22) Filed: May 6, 2022

(65) Prior Publication Data

US 2022/0404613 A1    Dec. 22, 2022

(30) Foreign Application Priority Data

Jun. 18, 2021   (JP) ................................. 2021-101749

(51) Int. Cl.
*G02B 26/10* (2006.01)
*G02B 26/08* (2006.01)

(52) U.S. Cl.
CPC ....... *G02B 26/101* (2013.01); *G02B 26/0858* (2013.01); *G02B 26/10* (2013.01)

(58) Field of Classification Search
None
See application file for complete search history.

(56) References Cited

U.S. PATENT DOCUMENTS

| 2004/0263932 | A1* | 12/2004 | Sakai ................... | G02B 26/105 |
| | | | | 348/E9.026 |
| 2015/0293349 | A1 | 10/2015 | Matozaki et al. | |
| 2017/0180690 | A1 | 6/2017 | Jackson | |
| 2018/0172984 | A1 | 6/2018 | Kimura et al. | |
| 2020/0314395 | A1* | 10/2020 | Greif .................. | G02B 26/0841 |

FOREIGN PATENT DOCUMENTS

| EP | 1 455 217 A1 | 9/2004 |
| EP | 1 806 571 A1 | 7/2007 |
| JP | 2010-79198 A | 4/2010 |
| JP | 2010-256774 A | 11/2010 |
| JP | 2012-63413 A | 3/2012 |

(Continued)

OTHER PUBLICATIONS

Extended European Search Report for European Application No. 22173297.7, dated Nov. 22, 2022.

(Continued)

*Primary Examiner* — Phu Vu
(74) *Attorney, Agent, or Firm* — Birch, Stewart, Kolasch & Birch, LLP

(57) ABSTRACT

A driving controller derives a first shift time that is a shift time used for correcting a generation timing of a first reference signal representing that an angle of a mirror portion around a first axis is equal to a first reference angle, and is a shift time of a point in time when the angle of the mirror portion around the first axis is equal to the first reference angle with respect to a point in time when an output signal of a first angle detection sensor represents that the angle of the mirror portion around the first axis is equal to the first reference angle, based on an output signal of a photodetector.

18 Claims, 23 Drawing Sheets

(56) References Cited

FOREIGN PATENT DOCUMENTS

| | | | |
|---|---|---|---|
| JP | 2012063413 A | * | 3/2012 |
| JP | 2018-101115 A | | 6/2018 |
| JP | 2019-509507 A | | 4/2019 |
| JP | 2020-16720 A | | 1/2020 |
| JP | 2021-33011 A | | 3/2021 |
| WO | WO 2014/097683 A1 | | 6/2014 |

OTHER PUBLICATIONS

Japanese Office Action for Japanese Application No. 2021-101749; dated Oct. 8, 2024, with an English translation.

* cited by examiner

FIRST SIGNAL PROCESSING

FIG. 32
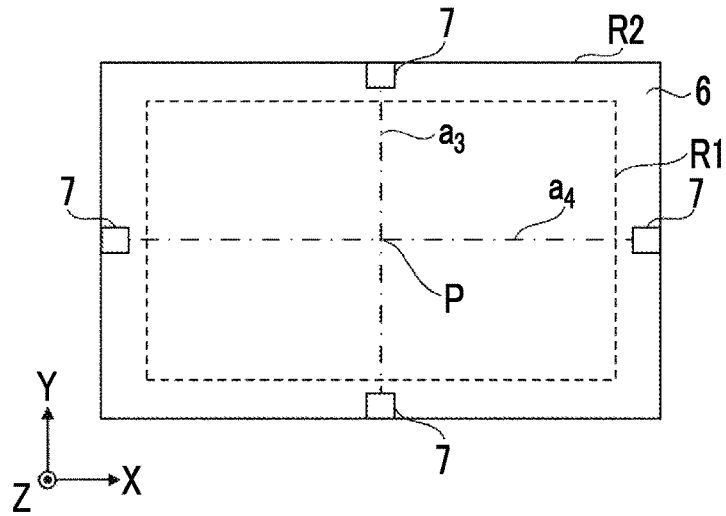
FIG. 33
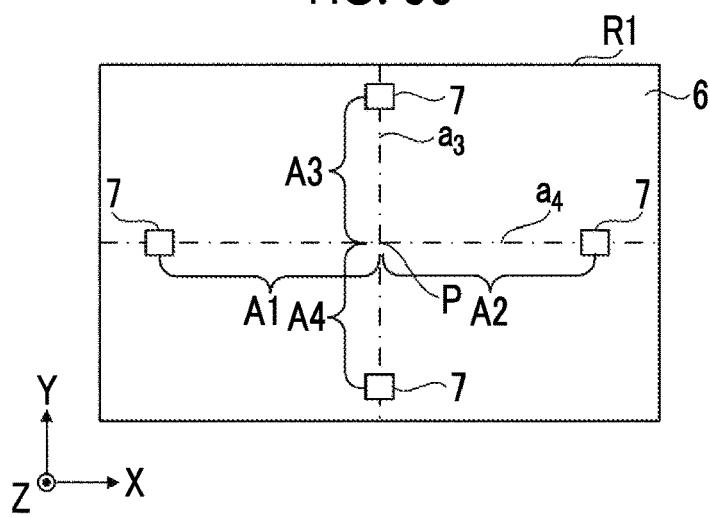
FIG. 34

OPTICAL SCANNING DEVICE, DRIVING METHOD OF OPTICAL SCANNING DEVICE, AND IMAGE DRAWING SYSTEM

CROSS-REFERENCE TO RELATED APPLICATIONS

The present application claims priority under 35 U.S.C. § 119 to Japanese Patent Application No. 2021-101749 filed on Jun. 18, 2021. The above application is hereby expressly incorporated by reference, in its entirety, into the present application.

BACKGROUND

1. Technical Field

The present disclosure relates to an optical scanning device, a driving method of an optical scanning device, and an image drawing system.

2. Description of the Related Art

A micromirror device (also referred to as a microscanner) is known as one of micro electro mechanical systems (MEMS) devices manufactured using the silicon (Si) microfabrication technique. An optical scanning device comprising the micromirror device is small and has low power consumption. Thus, applications in image drawing systems such as laser displays or laser projectors are expected.

In the micromirror device, a mirror portion is formed to be capable of swinging around a first axis and a second axis that are orthogonal to each other, and light reflected by the mirror portion is two-dimensionally scanned by the swing of the mirror portion around each axis. In addition, a micromirror device that enables Lissajous scanning of light by causing a mirror portion to resonate around each axis has been known.

JP2010-256774A discloses a micromirror device comprising a protective member that protects a mirror portion and is provided in a reflection direction of light by the mirror portion to transmit the light reflected by the mirror portion, and a photodetector that is provided across from an inside of a range of transmission of the light reflected by the mirror portion to an outside of the range in the protective member. This micromirror device controls an amplitude of the mirror portion in accordance with a detection state of the light by the photodetector.

WO2014/097683A discloses an optical scanning device comprising a photodetector for detecting angle information of a mirror portion.

SUMMARY

In the optical scanning device, an irradiation timing of light by a light source that irradiates the mirror portion with the light is controlled based on a reference signal (for example, a zero cross signal) representing that the angle of the mirror portion is equal to a reference angle. That is, in a case where sensing accuracy of a timing at which the angle of the mirror portion is equal to the reference angle by the optical scanning device is decreased, image quality of a drawn image is decreased.

However, in the techniques disclosed in JP2010-256774A and WO2014/097683A, improving the sensing accuracy of the timing at which the angle of the mirror portion is equal to the reference angle using the photodetector is not considered.

The present disclosure is conceived in view of the above matter, and an object thereof is to provide an optical scanning device, a driving method of an optical scanning device, and an image drawing system that can suppress a decrease in image quality of a drawn image.

An optical scanning device according to an aspect of the present disclosure is an optical scanning device comprising a mirror portion that has a reflecting surface on which an incidence ray is reflected, a first actuator that causes the mirror portion to swing around a first axis which is in a plane including the reflecting surface at a time of a standstill of the mirror portion, a second actuator that causes the mirror portion to swing around a second axis which is in the plane including the reflecting surface at the time of the standstill of the mirror portion and intersects with the first axis, a first angle detection sensor that outputs a signal corresponding to an angle of the mirror portion around the first axis, a second angle detection sensor that outputs a signal corresponding to an angle of the mirror portion around the second axis, at least one photodetector provided at a position at which reflected light from the mirror portion is receivable, and at least one processor, in which the processor is configured to provide a first driving signal having a first driving frequency to the first actuator, provide a second driving signal having a second driving frequency to the second actuator, derive a first shift time that is a shift time used for correcting a generation timing of a first reference signal representing that the angle of the mirror portion around the first axis is equal to a first reference angle, and is a shift time of a point in time when the angle of the mirror portion around the first axis is equal to the first reference angle with respect to a point in time when the output signal of the first angle detection sensor represents that the angle of the mirror portion around the first axis is equal to the first reference angle, based on an output signal of the photodetector, and derive a second shift time that is a shift time used for correcting a generation timing of a second reference signal representing that the angle of the mirror portion around the second axis is equal to a second reference angle, and is a shift time of a point in time when the angle of the mirror portion around the second axis is equal to the second reference angle with respect to a point in time when the output signal of the second angle detection sensor represents that the angle of the mirror portion around the second axis is equal to the second reference angle, based on the output signal of the photodetector.

In the optical scanning device according to the aspect of the present disclosure, one photodetector may be provided at a center of a region in which an image is drawn by the reflected light from the mirror portion.

In addition, in the optical scanning device according to the aspect of the present disclosure, the photodetector may be provided on an axis corresponding to the first axis and on an axis corresponding to the second axis in a region in which an image is drawable by the reflected light from the mirror portion.

In addition, in the optical scanning device according to the aspect of the present disclosure, at least one photodetector may be provided in each end part on the axis corresponding to the first axis and each end part on the axis corresponding to the second axis in the region in which the image is drawable by the reflected light from the mirror portion.

In addition, in the optical scanning device according to the aspect of the present disclosure, the processor may be configured to derive a first average phase delay time by averaging a first phase delay time of the output signal of the first angle detection sensor with respect to the first driving signal in a plurality of cycles, and derive a second average phase delay time by averaging a second phase delay time of the output signal of the second angle detection sensor with respect to the second driving signal in a plurality of cycles, the point in time when the output signal of the first angle detection sensor represents that the angle of the mirror portion around the first axis is equal to the first reference angle may be a point in time after an elapse of the first average phase delay time from a point in time when the first driving signal represents that the angle of the mirror portion around the first axis is equal to the first reference angle, and the point in time when the output signal of the second angle detection sensor represents that the angle of the mirror portion around the second axis is equal to the second reference angle may be a point in time after an elapse of the second average phase delay time from a point in time when the second driving signal represents that the angle of the mirror portion around the second axis is equal to the second reference angle.

In addition, in the optical scanning device according to the aspect of the present disclosure, the processor may be configured to derive the first average phase delay time by averaging the first phase delay time at a point in time when the output signal of the first angle detection sensor is zero, and derive the second average phase delay time by averaging the second phase delay time at a point in time when the output signal of the second angle detection sensor is zero.

In addition, in the optical scanning device according to the aspect of the present disclosure, the processor may be configured to derive the first average phase delay time by averaging the first phase delay time from a point in time when the first driving signal is zero to the point in time when the output signal of the first angle detection sensor is zero in a corresponding cycle, and derive the second average phase delay time by averaging the second phase delay time from a point in time when the second driving signal is zero to the point in time when the output signal of the second angle detection sensor is zero in a corresponding cycle.

In addition, in the optical scanning device according to the aspect of the present disclosure, the first reference angle and the second reference angle may be zero, the first shift time may be a time from a point in time when the output signal of the first angle detection sensor represents that the angle of the mirror portion around the first axis is zero to a point in time when the output signal of the photodetector represents that the angle of the mirror portion around the first axis is zero, and the second shift time may be a time from a point in time when the output signal of the second angle detection sensor represents that the angle of the mirror portion around the second axis is zero to a point in time when the output signal of the photodetector represents that the angle of the mirror portion around the second axis is zero.

In addition, in the optical scanning device according to the aspect of the present disclosure, the processor may be configured to generate the first reference signal at a point in time after an elapse of the first shift time from the point in time when the output signal of the first angle detection sensor represents that the angle of the mirror portion around the first axis is equal to the first reference angle, and generate the second reference signal at a point in time after an elapse of the second shift time from the point in time when the output signal of the second angle detection sensor represents that the angle of the mirror portion around the second axis is equal to the second reference angle.

In addition, in the optical scanning device according to the aspect of the present disclosure, a shift time derivation mode in which the first shift time and the second shift time are derived may be provided, and the processor may be configured to acquire the first shift time and the second shift time for each preset condition by executing the shift time derivation mode in calibration, and use the first shift time and the second shift time acquired in advance in the calibration in generating the first reference signal and the second reference signal.

In addition, in the optical scanning device according to the aspect of the present disclosure, the condition may include the first phase delay time and the second phase delay time.

In addition, in the optical scanning device according to the aspect of the present disclosure, the condition may further include a driving voltage of the first driving signal and a driving voltage of the second driving signal.

In addition, in the optical scanning device according to the aspect of the present disclosure, the condition may further include the first driving frequency and the second driving frequency.

In addition, in the optical scanning device according to the aspect of the present disclosure, the condition may further include an ambient temperature.

In addition, in the optical scanning device according to the aspect of the present disclosure, the photodetector may be a photodiode.

In addition, in the optical scanning device according to the aspect of the present disclosure, the photodetector may be in a non-driven state during drawing of an image.

In addition, in the optical scanning device according to the aspect of the present disclosure, the first angle detection sensor may include a pair of angle detection sensors arranged at positions that face each other with the first axis or the second axis interposed between the positions, the output signal of the first angle detection sensor may be an output signal obtained by adding or subtracting a pair of output signals output from the pair of angle detection sensors, the second angle detection sensor may include a pair of angle detection sensors arranged at positions that face each other with the first axis or the second axis interposed between the positions, and the output signal of the second angle detection sensor may be an output signal obtained by adding or subtracting a pair of output signals output from the pair of angle detection sensors.

In addition, an image drawing system according to another aspect of the present disclosure comprises above any optical scanning device, and a light source that irradiates the mirror portion with light.

In addition, a driving method of an optical scanning device according to still another aspect of the present disclosure is a driving method of an optical scanning device including a mirror portion that has a reflecting surface on which an incidence ray is reflected, a first actuator that causes the mirror portion to swing around a first axis which is in a plane including the reflecting surface at a time of a standstill of the mirror portion, a second actuator that causes the mirror portion to swing around a second axis which is in the plane including the reflecting surface at the time of the standstill of the mirror portion and intersects with the first axis, a first angle detection sensor that outputs a signal corresponding to an angle of the mirror portion around the first axis, a second angle detection sensor that outputs a signal corresponding to an angle of the mirror portion around the second axis, and at least one photodetector provided at a position at which reflected light from the mirror portion is receivable, the driving method comprising providing a first driving signal having a first driving frequency to the first actuator, providing a second driving signal having a second driving frequency to the second actuator, deriving a first shift time that is a shift time used for correcting a generation timing of a first reference signal representing that the angle of the mirror portion around the first axis is equal to a first reference angle, and is a shift time of a point in time when the angle of the mirror portion around the first axis is equal to the first reference angle with respect to a point in time when the output signal of the first angle detection sensor represents that the angle of the mirror portion around the first axis is equal to the first reference angle, based on an output signal of the photodetector, and deriving a second shift time that is a shift time used for correcting a generation timing of a second reference signal representing that the angle of the mirror portion around the second axis is equal to a second reference angle, and is a shift time of a point in time when the angle of the mirror portion around the second axis is equal to the second reference angle with respect to a point in time when the output signal of the second angle detection sensor represents that the angle of the mirror portion around the second axis is equal to the second reference angle, based on the output signal of the photodetector.

According to the present disclosure, a decrease in image quality of a drawn image can be suppressed.

BRIEF DESCRIPTION OF THE DRAWINGS

FIG. 32 is a diagram showing the arrangement position of the photodetector according to the modification example.

FIG. 33 is a diagram showing the arrangement position of the photodetector according to the modification example.

FIG. 34 is a diagram showing an example of the relationship between the first average phase delay time and the first shift time in a case where a driving voltage of the first driving signal is differently set.

DETAILED DESCRIPTION

Hereinafter, an embodiment according to the technique of the present disclosure will be described in detail with reference to the drawings.

Figure 1:
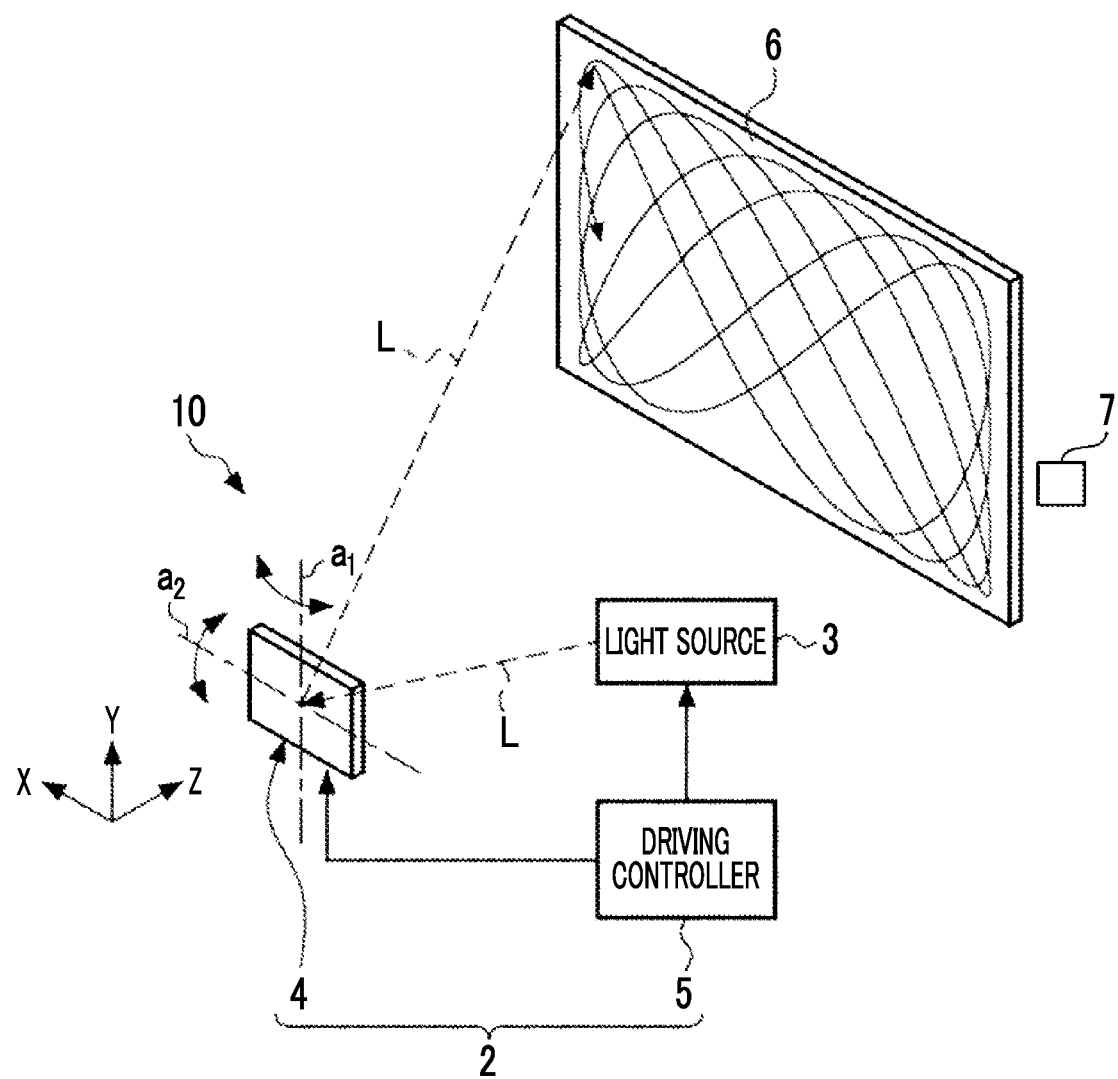
FIG. 1 is a schematic diagram of an image drawing system.

First, a configuration of an image drawing system 10 according to the present embodiment will be described with reference to FIG. 1. As shown in FIG. 1, the image drawing system 10 includes an optical scanning device 2 and a light source 3. The optical scanning device 2 includes a micromirror device (hereinafter, referred to as an "MMD") 4, a driving controller 5, and a photodetector 7. The driving controller 5 is an example of a processor according to the embodiment of the technique of the disclosure.

The image drawing system 10 draws an image by optically scanning a surface to be scanned 6 by reflecting a light beam L of irradiation from the light source 3 by the MMD 4 under control of the driving controller 5. The surface to be scanned 6 is, for example, a screen for projecting the image, or a retina of an eye of a person.

The image drawing system 10 is applied to, for example, a Lissajous scanning type laser display. Specifically, the image drawing system 10 can be applied to a laser scanning display such as augmented reality (AR) glasses or virtual reality (VR) glasses.

The MMD 4 is a piezoelectric biaxial drive type micromirror device capable of causing a mirror portion 20 (see FIG. 2) to swing around a first axis $a_1$ and a second axis $a_2$ orthogonal to the first axis $a_1$. Hereinafter, a direction parallel to the second axis $a_2$ will be referred to as an X direction, a direction parallel to the first axis $a_1$ will be referred to as a Y direction, and a direction orthogonal to the first axis $a_1$ and the second axis $a_2$ will be referred to as a Z direction. In the present embodiment, while an example in which the first axis $a_1$ is orthogonal to (that is, perpendicularly intersects with) the second axis $a_2$ is shown, the first axis $a_1$ may intersect with the second axis $a_2$ at an angle other than 90°. Here, intersecting means being within a constant angle range centered at 90 degrees including an allowable error.

The light source 3 is a laser device that emits, for example, laser light as the light beam L. For example, the light source 3 outputs laser light of three colors of red (R), green (G), and blue (B). It is preferable that the light source 3 perpendicularly irradiates a reflecting surface 20A (see FIG. 2) comprised in the mirror portion 20 with the light beam L in a state where the mirror portion 20 of the MMD 4 is at a standstill. In a case where the reflecting surface 20A is perpendicularly irradiated with the light beam L from the light source 3, the light source 3 may be an obstacle in the drawing by scanning the surface to be scanned 6 with the light beam L. Thus, it is preferable that the reflecting surface 20A is perpendicularly irradiated with the light beam L emitted from the light source 3 by controlling the light beam L by an optical system. The optical system may include a lens or may not include a lens. In addition, an angle at which the reflecting surface 20A is irradiated with the light beam L emitted from the light source 3 is not limited to a perpendicular angle. The reflecting surface 20A may be irradiated with the light beam L in an inclined manner.

The driving controller 5 outputs a driving signal to the light source 3 and the MMD 4 based on optical scanning information. The light source 3 generates the light beam L based on the input driving signal and irradiates the MMD 4 with the light beam L. The MMD 4 causes the mirror portion 20 to swing around the first axis $a_1$ and the second axis $a_2$ based on the input driving signal.

By causing the mirror portion 20 to resonate around each of the first axis $a_1$ and the second axis $a_2$ by the driving controller 5, the light beam L reflected by the mirror portion 20 is scanned onto the surface to be scanned 6 such that the light beam L draws a Lissajous waveform. This optical scanning method is called a Lissajous scanning method.

The photodetector 7 photoelectrically converts an incidence ray and outputs a signal corresponding to a light quantity. As will be described in detail later, the photodetector 7 is not used in the drawing of the image on the surface to be scanned 6 by reflected light from the MMD 4 based on the drawing data and is used in calibration. Examples of the photodetector 7 include a photodiode.

Figure 2:
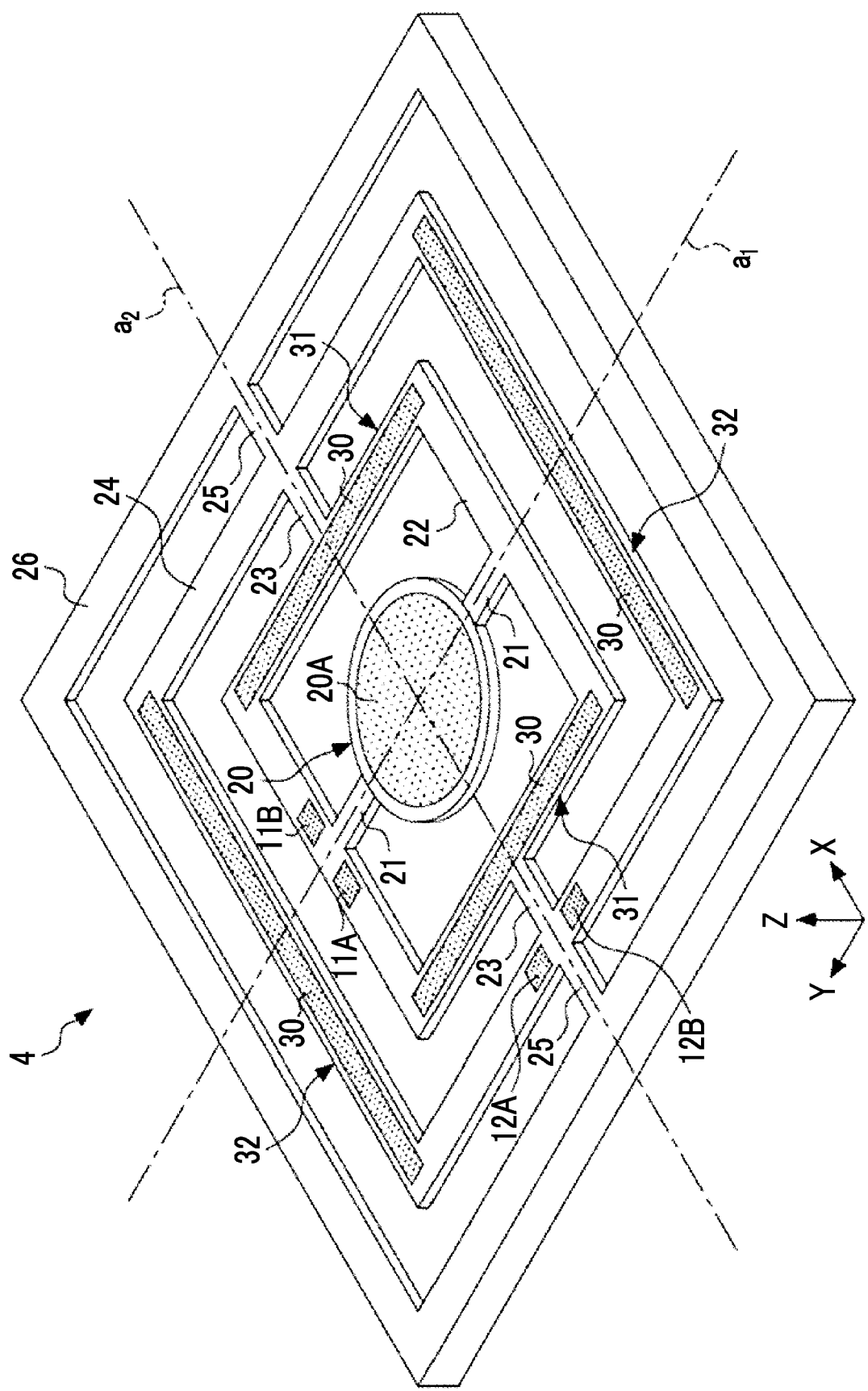
FIG. 2 is an external perspective view of a micromirror device.

Next, a configuration of the MMD 4 according to the present embodiment will be described with reference to FIG. 2. As shown in FIG. 2, the MMD 4 includes the mirror portion 20, a first support portion 21, a first movable frame 22, a second support portion 23, a second movable frame 24, a connecting portion 25, and a fixed frame 26. The MMD 4 is a so-called MEMS scanner.

The mirror portion 20 has the reflecting surface 20A for reflecting the incidence ray. The reflecting surface 20A is provided on one surface of the mirror portion 20 and is formed with a metal thin film of, for example, gold (Au), aluminum (Al), silver (Ag), or a silver alloy. A shape of the reflecting surface 20A is, for example, a circular shape centered at an intersection between the first axis $a_1$ and the second axis $a_2$.

The first axis $a_1$ and the second axis $a_2$ are present in a plane including the reflecting surface 20A at a time of a standstill when the mirror portion 20 is at a standstill. A planar shape of the MMD 4 is a rectangular shape and is axially symmetric with respect to the first axis $a_1$ and axially symmetric with respect to the second axis $a_2$.

The first support portion 21 is arranged outside the mirror portion 20 at each of positions that face each other with the second axis $a_2$ interposed therebetween. The first support portions 21 are connected to the mirror portion 20 on the first axis $a_1$ and support the mirror portion 20 to be capable of swinging around the first axis $a_1$. In the present embodiment, the first support portions 21 are torsion bars that stretch along the first axis $a_1$.

The first movable frame 22 is a frame having a rectangular shape surrounding the mirror portion 20 and is connected to the mirror portion 20 through the first support portion 21 on the first axis $a_1$. A piezoelectric element 30 is formed on the first movable frame 22 at each of positions that face each other with the first axis $a_1$ interposed therebetween. In such a manner, a pair of first actuators 31 are configured by forming two piezoelectric elements 30 on the first movable frame 22.

The pair of first actuators 31 are arranged at positions that face each other with the first axis $a_1$ interposed therebetween. The first actuators 31 cause the mirror portion 20 to swing around the first axis $a_1$ by applying rotational torque around the first axis $a_1$ to the mirror portion 20.

The second support portion 23 is arranged outside the first movable frame 22 at each of positions with the first axis $a_1$ interposed therebetween. The second support portions 23 are connected to the first movable frame 22 on the second axis $a_2$ and support the first movable frame 22 and the mirror portion 20 to be capable of swinging around the second axis $a_2$. In the present embodiment, the second support portions 23 are torsion bars that stretch along the second axis $a_2$.

The second movable frame 24 is a frame having a rectangular shape surrounding the first movable frame 22 and is connected to the first movable frame 22 through the second support portion 23 on the second axis $a_2$. The piezoelectric element 30 is formed on the second movable frame 24 at each of positions that face each other with the second axis $a_2$ interposed therebetween. In such a manner, a pair of second actuators 32 are configured by forming two piezoelectric elements 30 on the second movable frame 24.

The pair of second actuators 32 are arranged at positions that face each other with the second axis $a_2$ interposed therebetween. The second actuators 32 cause the mirror portion 20 to swing around the second axis $a_2$ by applying rotational torque about the second axis $a_2$ to the mirror portion 20 and the first movable frame 22.

The connecting portion 25 is arranged outside the second movable frame 24 at each of positions with the first axis $a_1$ interposed therebetween. The connecting portions 25 are connected to the second movable frame 24 on the second axis $a_2$.

The fixed frame 26 is a frame having a rectangular shape surrounding the second movable frame 24 and is connected to the second movable frame 24 through the connecting portion 25 on the second axis $a_2$.

In addition, a pair of first angle detection sensors 11A and 11B are provided in the first movable frame 22 near the first support portions 21 at positions that face each other with the first axis $a_1$ interposed therebetween. Each of the pair of first angle detection sensors 11A and 11B is configured with a piezoelectric element. Each of the first angle detection sensors 11A and 11B outputs a signal by converting a force applied by deformation of the first support portion 21 accompanied by rotational movement of the mirror portion 20 around the first axis $a_1$ into a voltage. That is, the first angle detection sensors 11A and 11B output signals corresponding to an angle of the mirror portion 20 around the first axis $a_1$.

In addition, a pair of second angle detection sensors 12A and 12B are provided in the second movable frame 24 near the second support portions 23 at positions that face each other with the second axis $a_2$ interposed therebetween. Each of the pair of second angle detection sensors 12A and 12B is configured with a piezoelectric element. Each of the second angle detection sensors 12A and 12B outputs a signal by converting a force applied by deformation of the second support portion 23 accompanied by rotational movement of the mirror portion 20 around the second axis $a_2$ into a voltage. That is, the second angle detection sensors 12A and 12B output signals corresponding to the angle of the mirror portion 20 around the second axis $a_2$.

In FIG. 2, wiring lines and electrode pads for providing driving signals to the first actuators 31 and the second actuators 32 are not shown. In addition, in FIG. 2, wiring lines and electrode pads for outputting signals from the first angle detection sensors 11A and 11B and the second angle detection sensors 12A and 12B are not shown. A plurality of electrode pads are provided on the fixed frame 26.

A deflection angle (hereinafter, referred to as a "first deflection angle") $\theta_1$ of the mirror portion 20 around the first axis $a_1$ is controlled by the driving signal (hereinafter, referred to as a "first driving signal") provided to the first actuators 31 by the driving controller 5. The first driving signal is, for example, a sinusoidal alternating current voltage. The first driving signal includes a driving voltage waveform $V_{1A}(t)$ applied to one of the pair of first actuators 31 and a driving voltage waveform $V_{1B}(t)$ applied to the other. The driving voltage waveform $V_{1A}(t)$ and the driving voltage waveform $V_{1B}(t)$ are in anti-phase with each other (that is, have a phase difference of (180°).

The first deflection angle $\theta_1$ is an angle at which a line normal to the reflecting surface 20A is inclined with respect to the Z direction in an XZ plane.

A deflection angle (hereinafter, referred to as a "second deflection angle") $\theta_2$ of the mirror portion 20 around the second axis $a_2$ is controlled by the driving signal (hereinafter, referred to as a "second driving signal") provided to the second actuators 32 by the driving controller 5. The second driving signal is, for example, a sinusoidal alternating current voltage. The second driving signal includes a driving voltage waveform $V_{2A}(t)$ applied to one of the pair of second actuators 32 and a driving voltage waveform $V_{2B}(t)$ applied to the other. The driving voltage waveform $V_{2A}(t)$ and the driving voltage waveform $V_{2B}(t)$ are in anti-phase with each other (that is, have a phase difference of (180°).

The second deflection angle $\theta_2$ is an angle at which the line normal to the reflecting surface 20A is inclined with respect to the Z direction in a YZ plane.

Figure 3:
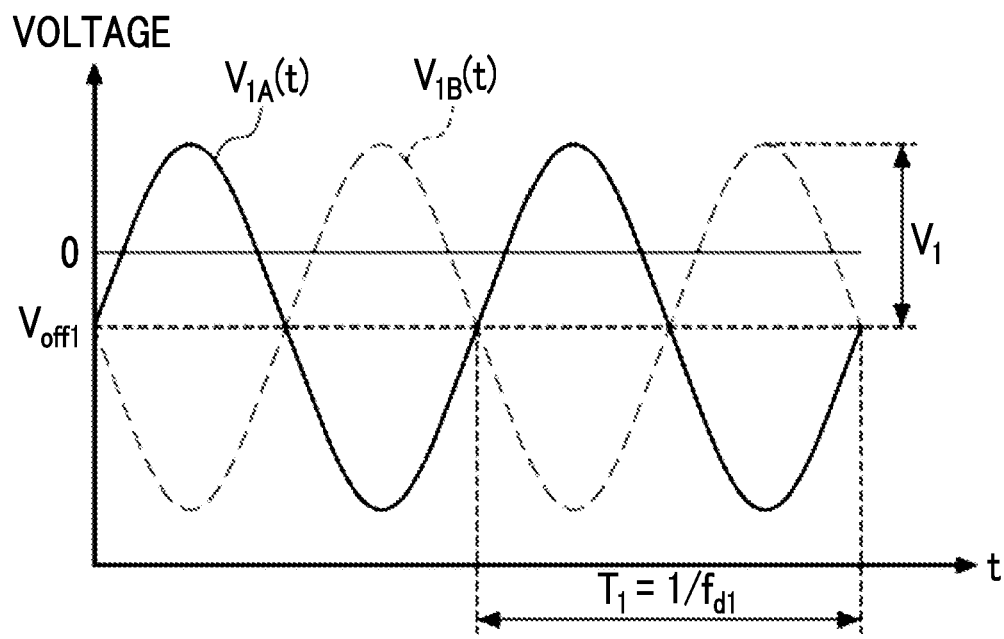
FIG. 3 is a graph showing an example of a first driving signal.
Figure 4:
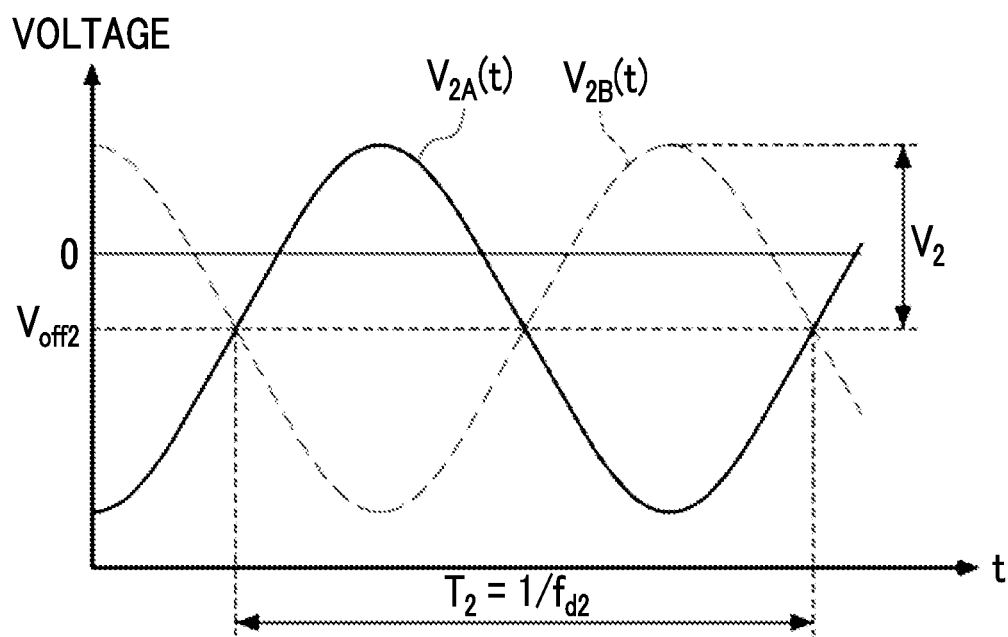
FIG. 4 is a graph showing an example of a second driving signal.

FIG. 3 shows an example of the first driving signal, and FIG. 4 shows an example of the second driving signal. FIG. 3 shows the driving voltage waveforms $V_{1A}(t)$ and $V_{1B}(t)$ included in the first driving signal. FIG. 4 shows the driving voltage waveforms $V_{2A}(t)$ and $V_{2B}(t)$ included in the second driving signal.

Each of the driving voltage waveforms $V_{1A}(t)$ and $V_{1B}(t)$ is represented as follows.

$V_{1B}(t) = V_{off1} + V_1 \sin(2\pi f_{d1} t)$
$V_{1B}(t) = V_{off1} + V_1 \sin(2\pi f_{d1} t + \alpha)$ Here, $V_1$ is an amplitude voltage. $V_{off1}$ is a bias voltage. $V_{off1}$ may be zero. In addition, $f_{d1}$ is a driving frequency (hereinafter, referred to as a "first driving frequency"). In addition, t is time. In addition, $\alpha$ is a phase difference between the driving voltage waveforms $V_{1A}(t)$ and $V_{1B}(t)$. In the present embodiment, for example, $\alpha = 180°$ is assumed.

By applying the driving voltage waveforms $V_{1A}(t)$ and $V_{1B}(t)$ to the pair of first actuators 31, the mirror portion 20 swings around the first axis $a_1$ with the first driving frequency $f_{d1}$.

Each of the driving voltage waveforms $V_{2A}(t)$ and $V_{2B}(t)$ is represented as follows.

$V_{2A}(t) = V_{off2} + V_2 \sin(2\pi f_{d2} t + \varphi)$
$V_{2B}(t) = V_{off2} + V_2 \sin(2\pi f_{d2} t + \beta + \varphi)$ Here, $V_2$ is an amplitude voltage. $V_{off2}$ is a bias voltage. $V_{off2}$ may be zero. In addition, $f_{d2}$ is a driving frequency (hereinafter, referred to as a "second driving frequency"). In addition, t is time. In addition, $\beta$ is a phase difference between the driving voltage waveforms $V_{2A}(t)$ and $V_{2B}(t)$. In the present embodiment, for example, $\beta = 180°$ is assumed. In addition, $\varphi$ is a phase difference between the driving voltage waveforms $V_{1A}(t)$ and $V_{1B}(t)$ and the driving voltage waveforms $V_{2A}(t)$ and $V_{2B}(t)$.

By applying the driving voltage waveforms $V_{2A}(t)$ and $V_{2B}(t)$ to the pair of second actuators 32, the mirror portion 20 swings around the second axis $a_2$ with the second driving frequency $f_{d2}$.

The first driving frequency $f_{d1}$ is set to match a resonance frequency of the mirror portion 20 around the first axis $a_1$. The second driving frequency $f_{d2}$ is set to match the resonance frequency of the mirror portion 20 around the second axis $a_2$. In the present embodiment, $f_{d1} > f_{d2}$ is assumed. That is, the mirror portion 20 has a higher swing frequency around the first axis $a_1$ than a swing frequency around the second axis $a_2$. The first driving frequency fin and the second driving frequency $f_{d2}$ may not necessarily match the resonance frequency. For example, each of the first driving frequency $f_{d1}$ and the second driving frequency $f_{d2}$ may be a frequency within a frequency range near the resonance frequency (for example, a half-width range of a frequency distribution having the resonance frequency as a peak value). For example, this frequency range is within a range of a so-called Q-value.

Figure 5:
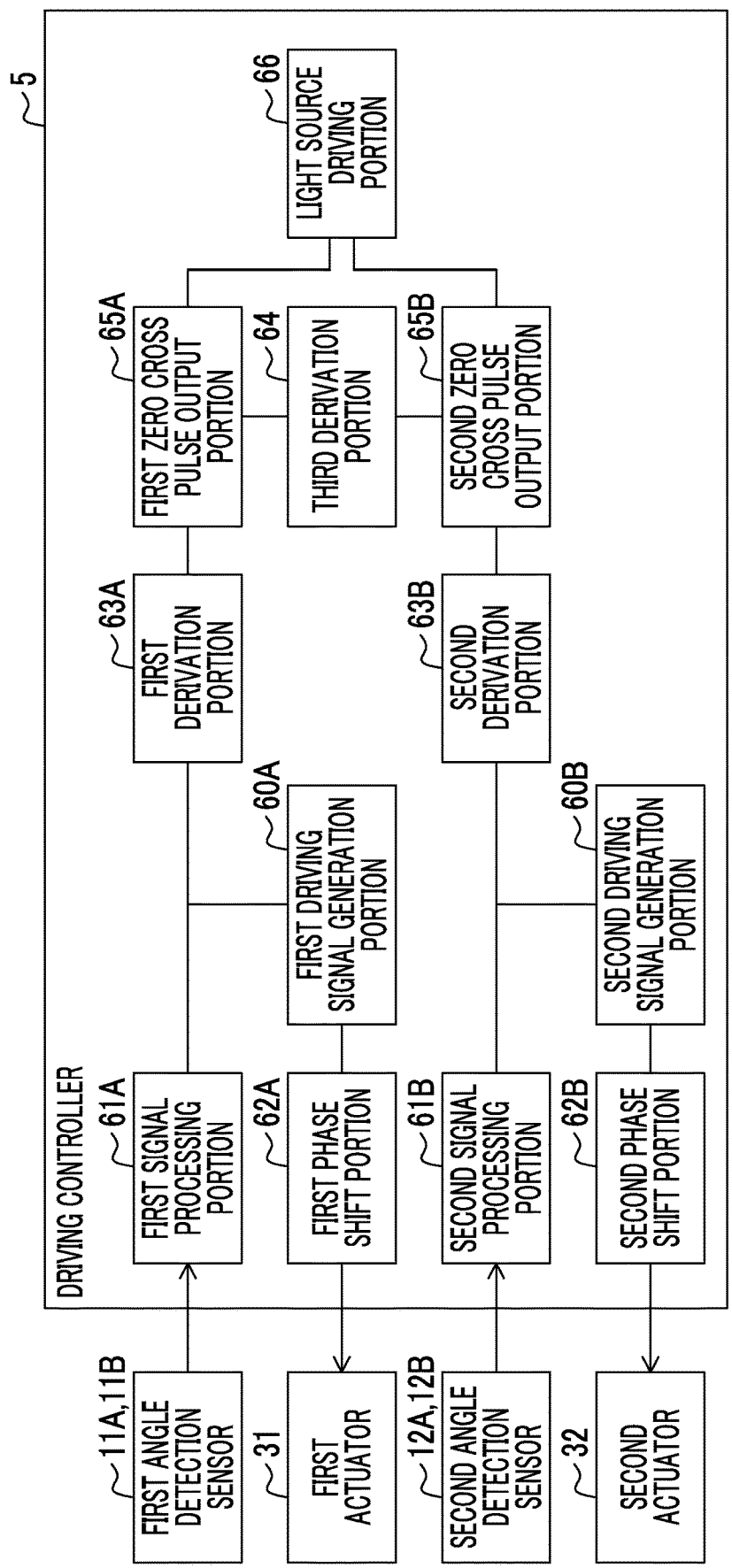
FIG. 5 is a block diagram showing an example of a functional configuration of a driving controller.

Next, a functional configuration of the driving controller 5 will be described with reference to FIG. 5. As shown in FIG. 5, the driving controller 5 includes a first driving signal generation portion 60A, a second driving signal generation portion 60B, a first signal processing portion 61A, a second signal processing portion 61B, a first phase shift portion 62A, a second phase shift portion 62B, a first derivation portion 63A, a second derivation portion 63B, a third derivation portion 64, a first zero cross pulse output portion 65A, a second zero cross pulse output portion 65B, and a light source driving portion 66.

The first driving signal generation portion 60A, the first signal processing portion 61A, and the first phase shift portion 62A may perform a feedback control to maintain a vibration state where the swing of the mirror portion 20 around the first axis $a_1$ has a designated frequency. The second driving signal generation portion 60B, the second signal processing portion 61B, and the second phase shift portion 62B may perform a feedback control to maintain a vibration state where the swing of the mirror portion 20 around the second axis $a_2$ has a designated frequency.

The first driving signal generation portion 60A generates the first driving signal including the driving voltage waveforms $V_{1A}(t)$ and $V_{1B}(t)$ based on a reference waveform and provides the generated first driving signal to the pair of first actuators 31 through the first phase shift portion 62A. Accordingly, the mirror portion 20 swings around the first axis $a_1$.

The second driving signal generation portion 60B generates the second driving signal including the driving voltage waveforms $V_{2A}(t)$ and $V_{2B}(t)$ based on the reference waveform and provides the generated second driving signal to the pair of second actuators 32 through the second phase shift portion 62B. Accordingly, the mirror portion 20 swings around the second axis $a_2$.

The first driving signal generated by the first driving signal generation portion 60A and the second driving signal generated by the second driving signal generation portion 60B are synchronized in phase as shown by φ in the expression showing the driving voltage waveforms $V_{2A}(t)$ and $V_{2B}(t)$ included in the second driving signal.

The first angle detection sensors 11A and 11B output the signals corresponding to the angle of the mirror portion 20 around the first axis $a_1$. The second angle detection sensors 12A and 12B output the signals corresponding to the angle of the mirror portion 20 around the second axis $a_2$.

Figure 6:
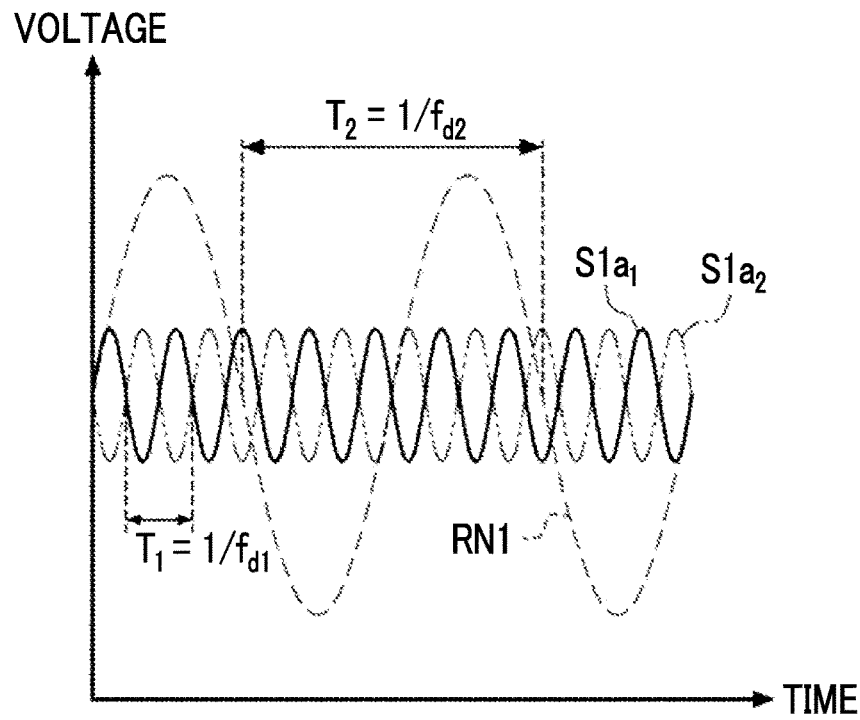
FIG. 6 is a diagram showing an example of signals output from a pair of first angle detection sensors.
Figure 6:
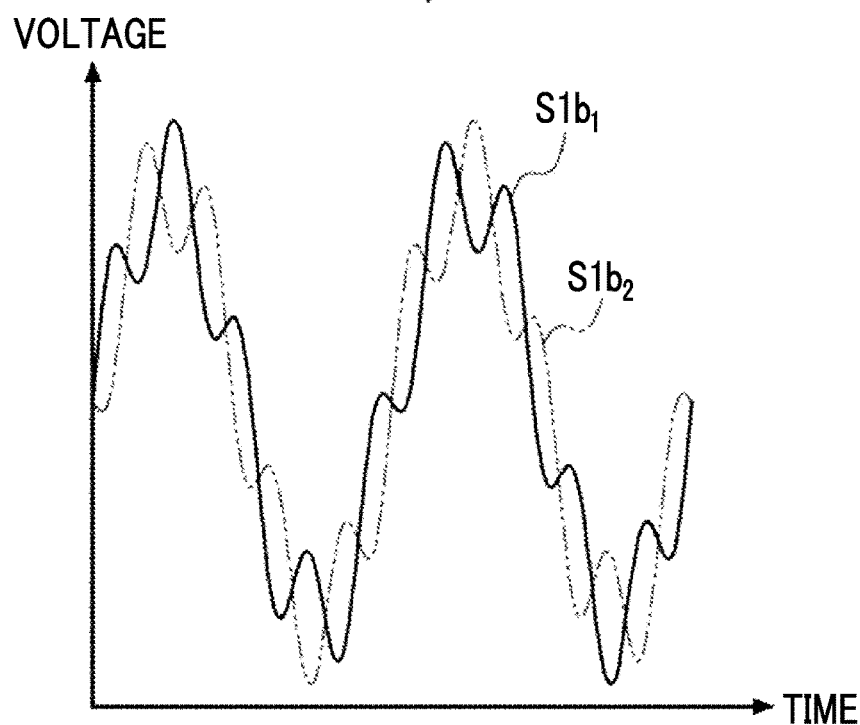

FIG. 6 shows an example of the signals output from the pair of first angle detection sensors 11A and 11B. In FIG. 6, $S1a_1$ and $S1a_2$ represent the signals output from the pair of first angle detection sensors 11A and 11B in a case where the mirror portion 20 is caused to swing around only the first axis $a_1$ and not swing around the second axis $a_2$. The signals $S1a_1$ and $S1a_2$ are waveform signals similar to a sinusoidal wave having the first driving frequency $f_{d1}$ and are in anti-phase with each other.

In a case where the mirror portion 20 is caused to swing around the first axis at and the second axis $a_2$ at the same time, a vibration noise RN1 caused by the swing of the mirror portion 20 around the second axis $a_2$ is superimposed on the output signals of the pair of first angle detection sensors 11A and 11B. $S1b_1$ represents a signal after the vibration noise RN1 is superimposed on the signal $S1a_1$. $S1b_2$ represents a signal after the vibration noise RN1 is superimposed on the signal $S1a_2$. In the example in FIG. 6, the vibration noise RN1 is shown in a highlighted manner for description of the present embodiment.

Figure 7:
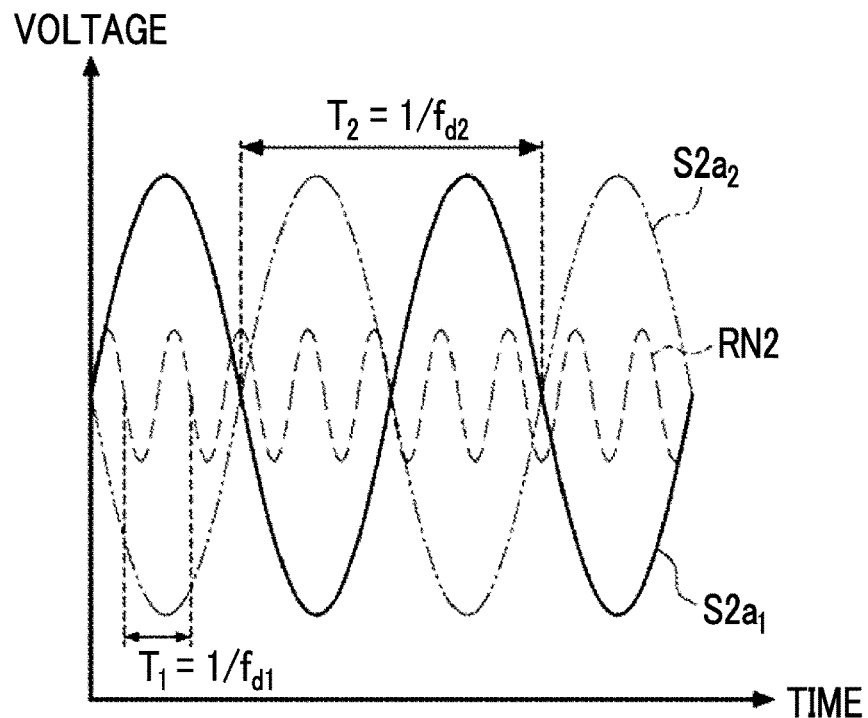
FIG. 7 is a diagram showing an example of signals output from a pair of second angle detection sensors.
Figure 7:
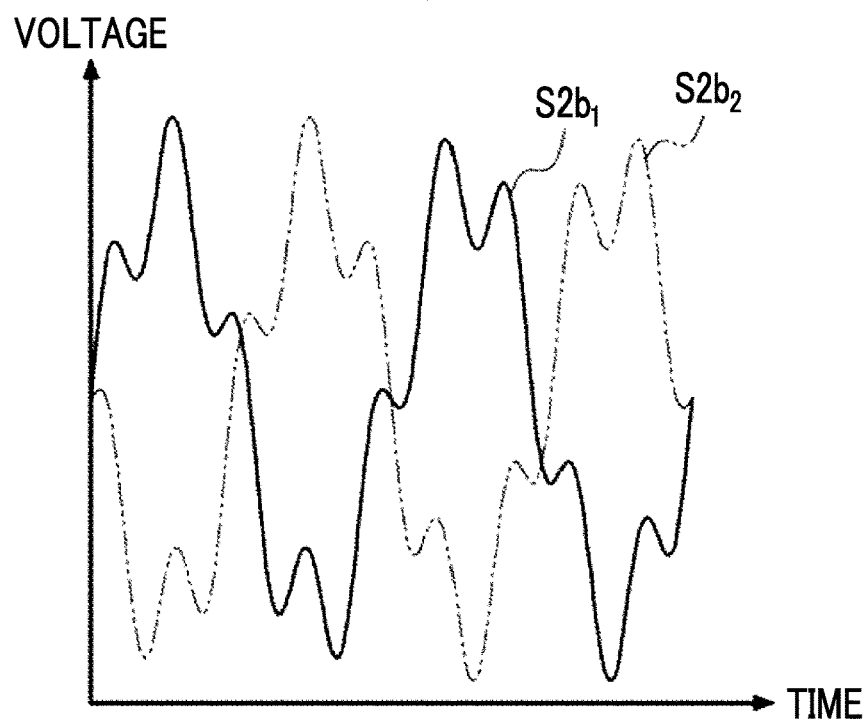

FIG. 7 shows an example of the signals output from the pair of second angle detection sensors 12A and 12B. In FIG. 7, $S2a_1$ and $S2a_2$ represent the signals output from the pair of second angle detection sensors 12A and 12B in a case where the mirror portion 20 is caused to swing around only the second axis $a_2$ and not swing around the first axis $a_1$. The signals $S2a_1$ and $S2a_2$ are waveform signals similar to a sinusoidal wave having the second driving frequency fie and are in anti-phase with each other.

In a case where the mirror portion 20 is caused to swing around the first axis at and the second axis $a_2$ at the same time, a vibration noise RN2 caused by the swing of the mirror portion 20 around the first axis $a_1$ is superimposed on the output signals of the pair of second angle detection sensors 12A and 12B. $S2b_1$ represents a signal obtained by the superimposition of the vibration noise RN2 on the signal $S2a_1$. $S2b_2$ represents a signal obtained by the superimposition of the vibration noise RN2 on the signal $S2a_2$. In the example in FIG. 7, the vibration noise RN2 is shown in a highlighted manner for description of the present embodiment.

The first signal processing portion 61A generates a signal (hereinafter, referred to as a "first angle detection signal") $S1c$ obtained by removing the vibration noise RN1 based on $S1a_1$ and $S1a_2$ output from the pair of first angle detection sensors 11A and 11B. The second signal processing portion 61B generates a signal (hereinafter, referred to as a "second angle detection signal") $S2c$ obtained by removing the vibration noise RN2 based on $S2a_1$ and $S2a_2$ output from the pair of second angle detection sensors 12A and 12B.

Figure 8:
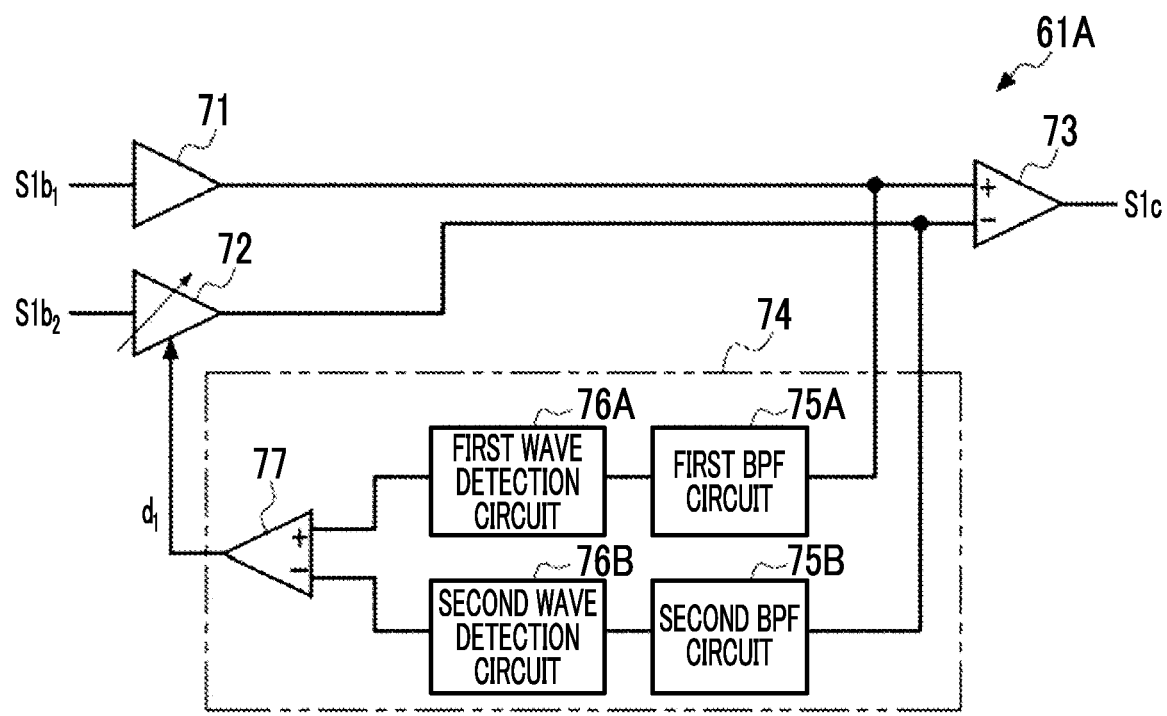
FIG. 8 is a circuit diagram showing an example of a configuration of a first signal processing portion.

The first signal processing portion 61A can be implemented by, for example, a circuit having a configuration shown in FIG. 8 as an example. As shown in FIG. 8, the first signal processing portion 61A is configured with a buffer amplifier 71, a variable gain amplifier 72, a subtraction circuit 73, and a gain adjustment circuit 74. The gain adjustment circuit 74 is configured with a first band pass filter (BPF) circuit 75A, a second BPF circuit 75B, a first wave detection circuit 76A, a second wave detection circuit 76B, and a subtraction circuit 77. The subtraction circuit 73 and the subtraction circuit 77 are differential amplification circuits configured with operational amplifiers.

The signal $S1b_1$ output from the first angle detection sensor 11A is input into a positive input terminal (non-inverting input terminal) of the subtraction circuit 73 through the buffer amplifier 71. In addition, a signal output from the buffer amplifier 71 branches in the middle of being input into the subtraction circuit 73 and is input into the first BPF circuit 75A in the gain adjustment circuit 74.

The signal $S1b_2$ output from the first angle detection sensor 11B is input into a negative input terminal (inverting input terminal) of the subtraction circuit 73 through the variable gain amplifier 72. In addition, a signal output from the variable gain amplifier 72 branches in the middle of being input into the subtraction circuit 73 and is input into the second BPF circuit 75B in the gain adjustment circuit 74.

Each of the first BPF circuit 75A and the second BPF circuit 75B has a passband B1 having the second driving frequency $f_{d2}$ as a center frequency. For example, the passband B1 is a frequency band of $f_{d2} \pm 5$ kH. The vibration noise RN1 has the second driving frequency $f_{d2}$ and thus, passes through the passband B1. Accordingly, the first BPF circuit 75A extracts the vibration noise RN1 from the signal input from the buffer amplifier 71 and outputs the vibration noise RN1. The second BPF circuit 75B extracts the vibration noise RN1 from the signal input from the variable gain amplifier 72 and outputs the vibration noise RN1.

Each of the first wave detection circuit 76A and the second wave detection circuit 76B is configured with, for example, a root mean squared value to direct current converter (RMS-DC converter). The first wave detection circuit 76A converts an amplitude of the vibration noise RN1 input from the first BPF circuit 75A into a DC voltage signal and inputs the DC voltage signal into a positive input terminal of the subtraction circuit 77. The second wave detection circuit 76B converts the amplitude of the vibration noise RN1 input from the second BPF circuit 75B into a DC voltage signal and inputs the DC voltage signal into a negative input terminal of the subtraction circuit 77.

The subtraction circuit 77 outputs a value $d_1$ obtained by subtracting the DC voltage signal input from the second wave detection circuit 76B from the DC voltage signal input from the first wave detection circuit 76A. The value $d_1$ corresponds to a difference between the amplitude of the vibration noise RN1 included in the signal $S1b_1$ output from the first angle detection sensor 11A and the amplitude of the vibration noise RN1 included in the signal $S1b_2$ output from the first angle detection sensor 11B. The subtraction circuit 77 inputs the value $d_1$ into a gain adjustment terminal of the variable gain amplifier 72 as a gain adjustment value.

The variable gain amplifier 72 adjusts an amplitude level of the signal $S1b_2$ by multiplying the signal $S1b_2$ input from the first angle detection sensor 11B by the value $d_1$ input as the gain adjustment value. In such a manner, by performing a feedback control by the gain adjustment circuit 74, the amplitude of the vibration noise RN1 included in the signal S1$b_2$ after passing through the variable gain amplifier 72 is adjusted to match the amplitude of the vibration noise RN1 included in the signal S1$b_1$ after passing through the buffer amplifier 71.

The subtraction circuit 73 outputs a value obtained by subtracting the signal S1$b_2$ input to the negative input terminal from the signal S1$b_1$ input to the positive input terminal. Since the amplitudes of the vibration noises RN1 included in both signals are matched by the feedback control, the vibration noises RN1 included in both signals are offset by subtraction processing performed by the subtraction circuit 73. Accordingly, the first angle detection signal S1$c$ (see FIG. 9) that is a signal obtained by removing the vibration noise RN1 is output from the subtraction circuit 73.

Figure 9:
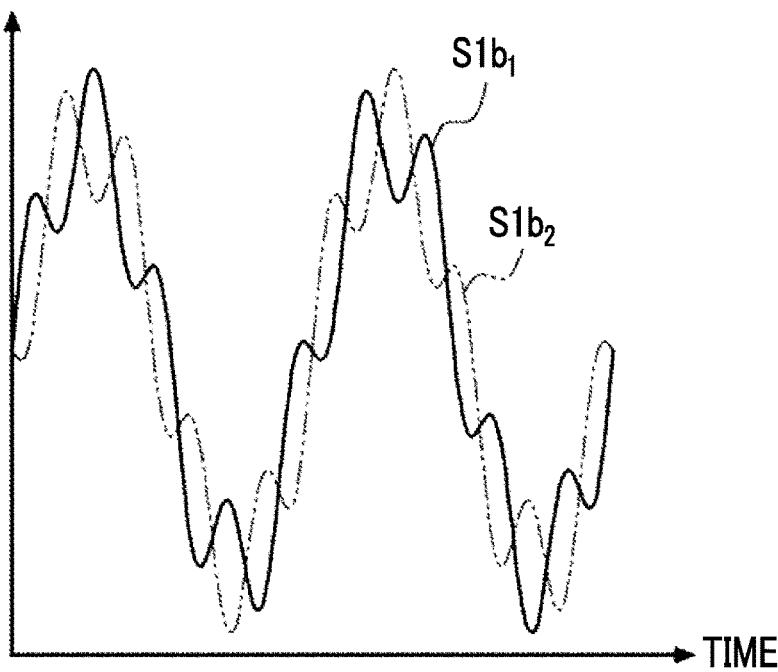
FIG. 9 is a diagram showing an example of first signal processing.
Figure 9:
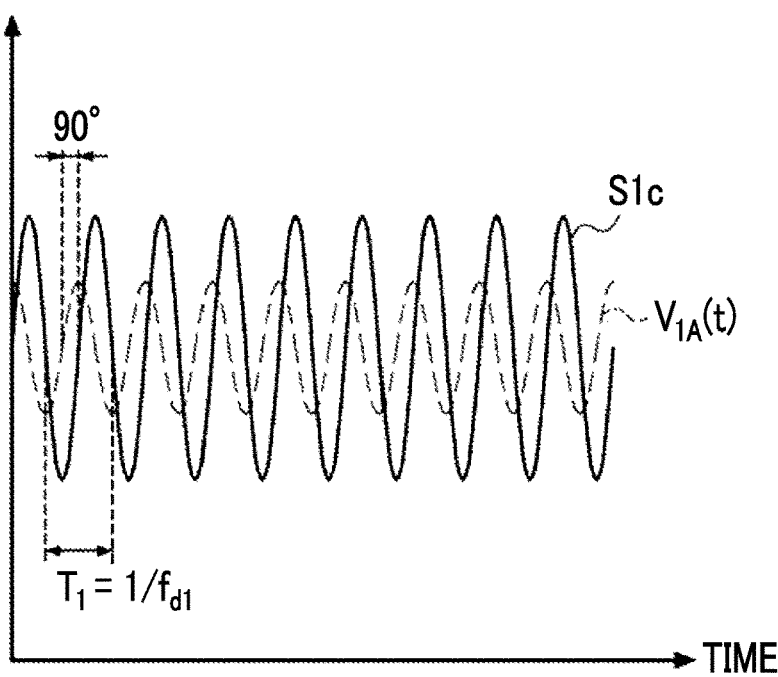

FIG. 9 shows a state where the first angle detection signal S1$c$ is generated based on S1$b_1$ and S1$b_2$ output from the pair of first angle detection sensors 11A and 11B. The first angle detection signal S1$c$ corresponds to a signal obtained by doubling an amplitude of the signal obtained by removing the vibration noise RN1 from the signal S1$b_1$.

In a case where the swing of the mirror portion 20 around the first axis $a_1$ maintains a resonance state, the first angle detection signal S1$c$ output from the first signal processing portion 61A has a delay of 90° in phase with respect to the driving voltage waveform $V_{1A}(t)$ included in the first driving signal as shown in FIG. 9.

The second signal processing portion 61B can be implemented by the same configuration as the first signal processing portion 61A and thus, will not be described.

Figure 10:
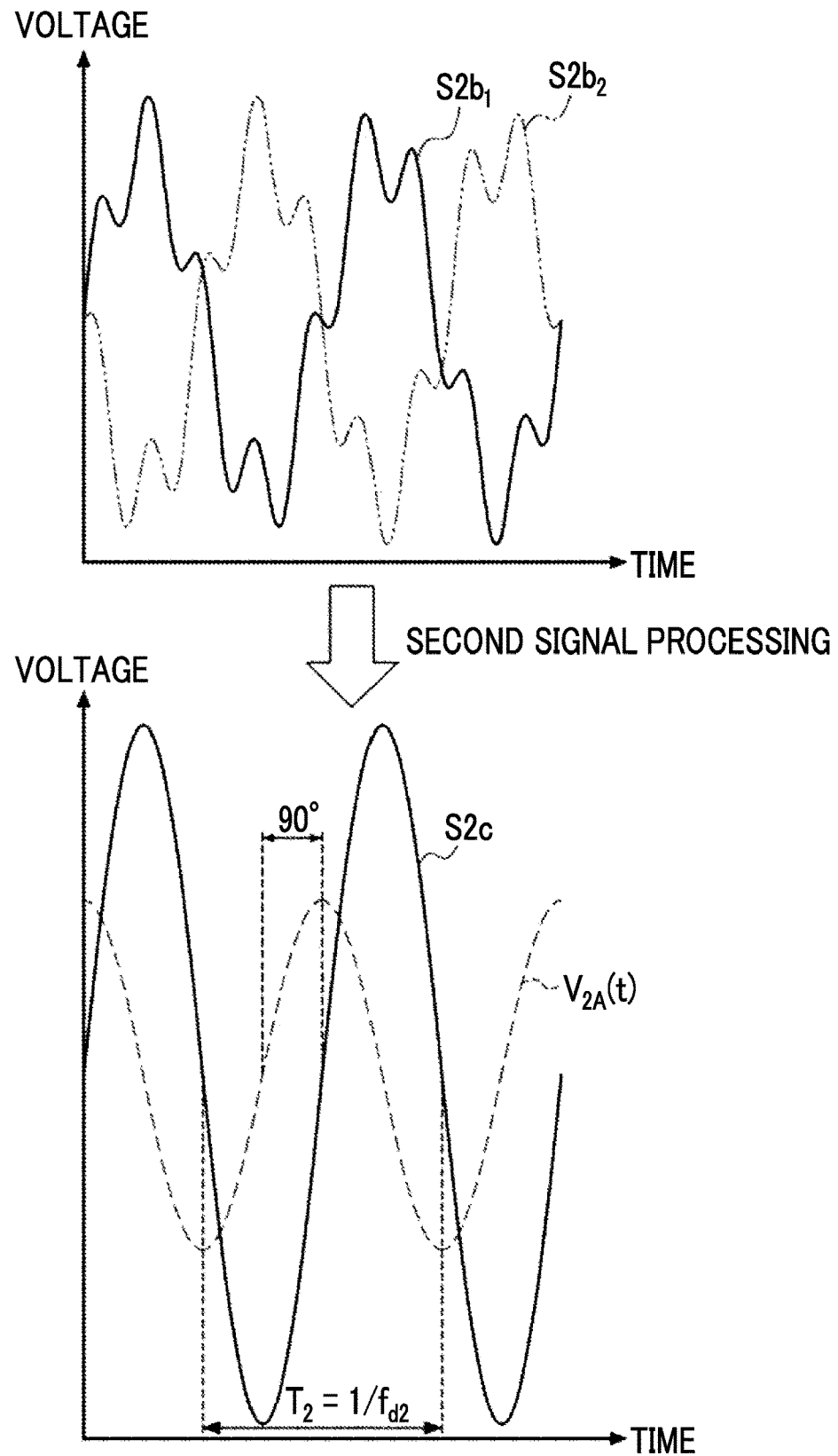
FIG. 10 is a diagram showing an example of second signal processing.

FIG. 10 shows a state where the second angle detection signal S2$c$ is generated based on S2$b_1$ and S2$b_2$ output from the pair of second angle detection sensors 12A and 12B. The second angle detection signal S2$c$ corresponds to a signal obtained by doubling an amplitude of the signal obtained by removing the vibration noise RN2 from the signal S2$b_1$.

In a case where the swing of the mirror portion 20 around the second axis $a_2$ maintains a resonance state, the second angle detection signal S2$c$ output from the second signal processing portion 61B has a delay of 90° in phase with respect to the driving voltage waveform $V_{2A}(t)$ included in the second driving signal as shown in FIG. 10.

The first angle detection signal S1$c$ generated by the first signal processing portion 61A is fed back to the first driving signal generation portion 60A. The first phase shift portion 62A shifts phases of the driving voltage waveforms output from the first driving signal generation portion 60A. For example, the first phase shift portion 62A shifts the phases by 90°.

The second angle detection signal S2$c$ generated by the second signal processing portion 61B is fed back to the second driving signal generation portion 60B. The second phase shift portion 62B shifts phases of the driving voltage waveforms output from the second driving signal generation portion 60B. For example, the second phase shift portion 62B shifts the phases by 90°.

Figure 11:
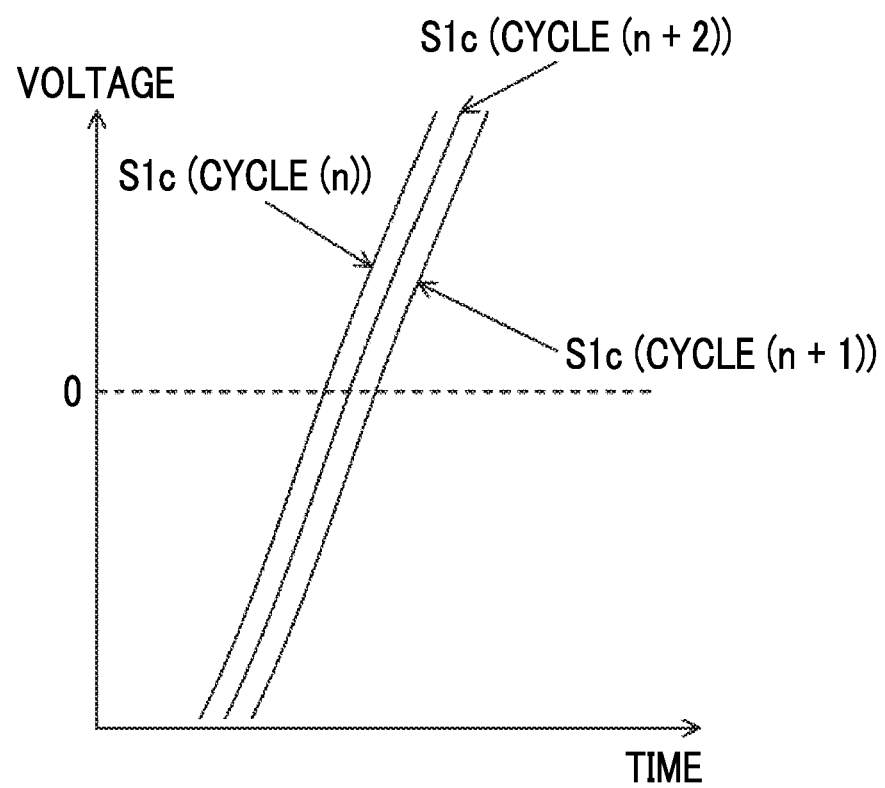
FIG. 11 is a diagram for describing shifting of a zero cross timing of a first angle detection signal.

The first angle detection signal S1$c$ generated by the first signal processing portion 61A is ideally a sinusoidal wave but generally not a smooth sinusoidal wave. This is because an influence of the swing of the mirror portion 20 around the second axis $a_2$ cannot be removed in processing performed by the first signal processing portion 61A. In this case, as shown in FIG. 11 as an example, a zero cross timing of the first angle detection signal S1$c$ is slightly shifted depending on a cycle. In FIG. 11, an example in which waveforms of the zero cross timing of first angle detection signal S1$c$ in a plurality of cycles are superimposed is shown.

Therefore, the first derivation portion 63A reduces an influence of the shift for each cycle by averaging the first angle detection signal S1$c$ in the plurality of cycles. Hereinafter, processing performed by the first derivation portion 63A will be described.

Figure 12:
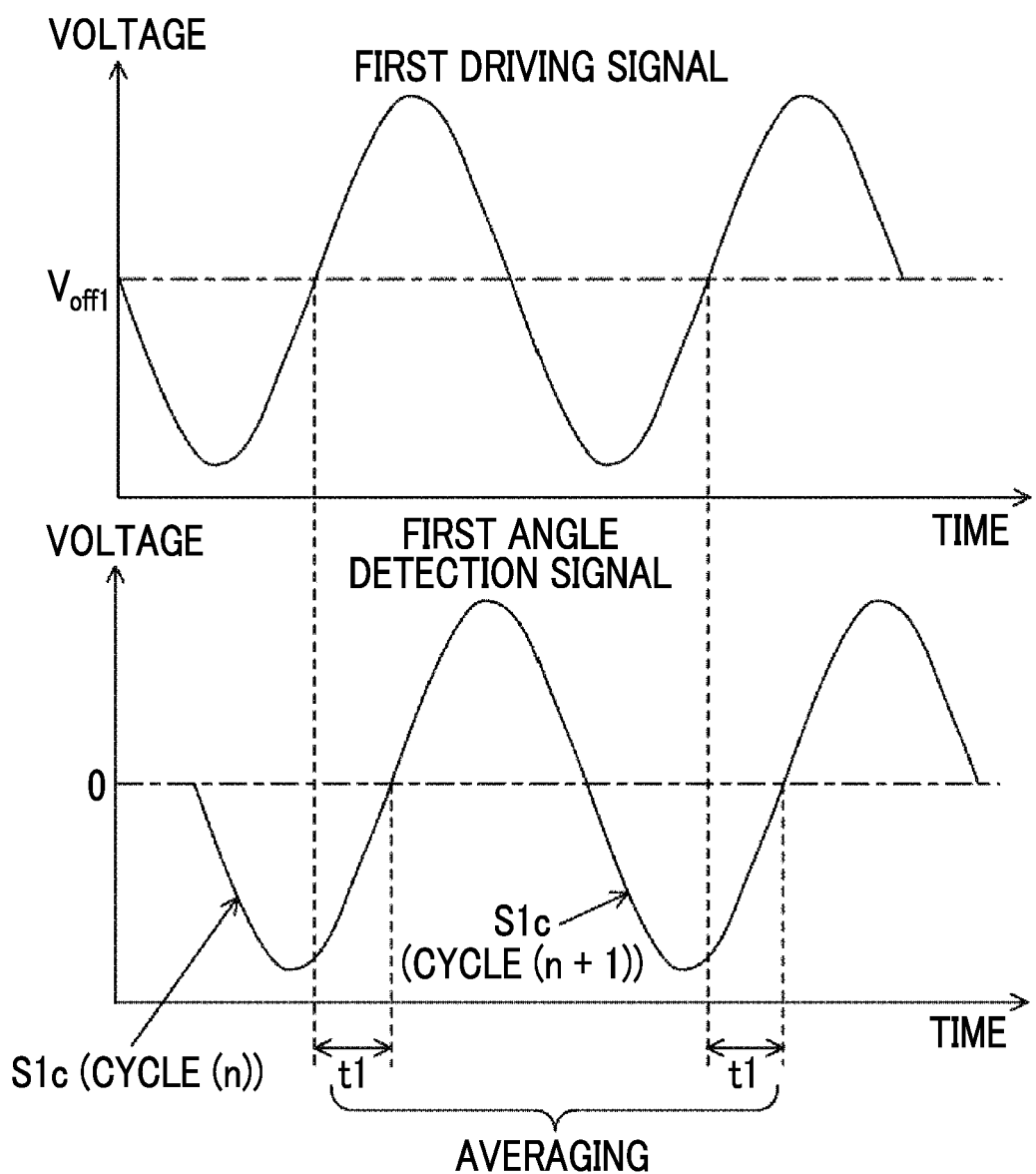
FIG. 12 is a diagram for describing derivation processing of a first average phase delay time.

The first derivation portion 63A derives a first average phase delay time by averaging a phase delay time (hereinafter, referred to as a "first phase delay time") of the first angle detection signal S1$c$ with respect to the first driving signal in the most recent plurality of cycles. Specifically, as shown in FIG. 12 as an example, for the first driving signal and the first angle detection signal S1$c$ in the most recent plurality of cycles, the first derivation portion 63A derives the first average phase delay time by averaging a first phase delay time t1 from a point in time when the first driving signal is zero to a point in time when the first angle detection signal S1$c$ is zero in a corresponding cycle. In the present embodiment, the first driving signal is offset by an amount corresponding to the bias voltage $V_{off1}$. Thus, the point in time when the first driving signal is zero means a point in time when the first driving signal is $V_{off1}$.

Similarly, the second angle detection signal S2$c$ generated by the second signal processing portion 61B is also ideally a sinusoidal wave but generally not a smooth sinusoidal wave because an influence of the swing of the mirror portion 20 around the first axis at remains. Therefore, the second derivation portion 63B reduces the influence of the shift for each cycle by averaging the second angle detection signal S2$c$ in the plurality of cycles. Hereinafter, processing performed by the second derivation portion 63B will be described.

Figure 13:
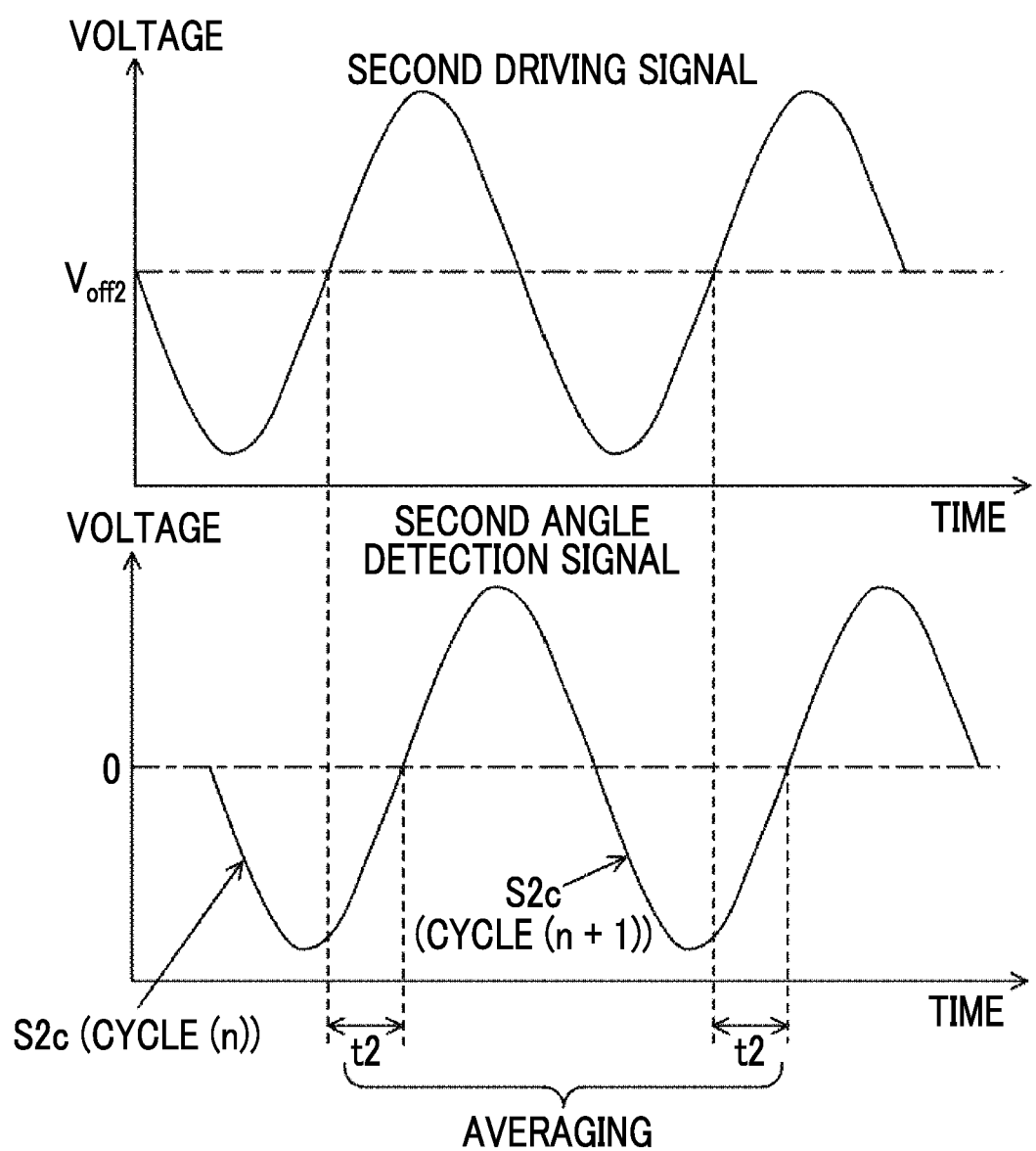
FIG. 13 is a diagram for describing derivation processing of a second average phase delay time.

The second derivation portion 63B derives a second average phase delay time by averaging a phase delay time (hereinafter, referred to as a "second phase delay time") of the second angle detection signal S2$c$ with respect to the second driving signal in the most recent plurality of cycles. Specifically, as shown in FIG. 13 as an example, for the second driving signal and the second angle detection signal S2$c$ in the most recent plurality of cycles, the second derivation portion 63B derives the second average phase delay time by averaging a second phase delay time t2 from a point in time when the second driving signal is zero to a point in time when the second angle detection signal S2$c$ is zero in a corresponding cycle. In the present embodiment, the second driving signal is offset by an amount corresponding to the bias voltage $V_{off2}$. Thus, the point in time when the second driving signal is zero means a point in time when the second driving signal is $V_{off2}$.

In the above processing performed by the first derivation portion 63A and the second derivation portion 63B, while the point in time when the sinusoidal wave is zero from a negative value toward a positive value is used, the present disclosure is not limited thereto. For example, a point in time when the sinusoidal wave is zero from a positive value toward a negative value may be used, or both of the point in time when the sinusoidal wave is zero from a negative value toward a positive value and the point in time when the sinusoidal wave is zero from a positive value toward a negative value may be used.

By the above processing performed by the first derivation portion 63A and the second derivation portion 63B, an influence of a difference in zero cross timing of the first angle detection signal S1$c$ and the second angle detection signal S2$c$ between each cycle can be reduced. However, a shift having a shift time $t3_1$ (hereinafter, referred to as the "first shift time $t3_1$") may occur between a timing at which the first angle detection signal S1c is zero and an actual timing at which the first deflection angle $\theta_1$ is zero. Similarly, a shift having a shift time $t3_2$ (hereinafter, referred to as the "second shift time $t3_2$") may occur between a timing at which the second angle detection signal S2c is zero and an actual timing at which the second deflection angle $\theta_2$ is zero.

Figure 14:
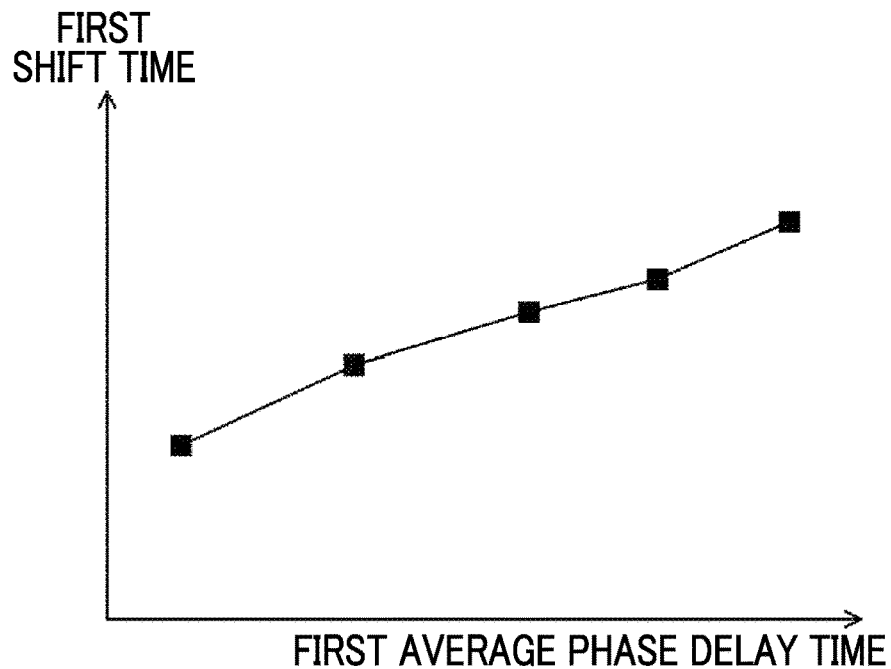
FIG. 14 is a diagram showing an example of a relationship between the first average phase delay time and a first shift time.
Figure 15:
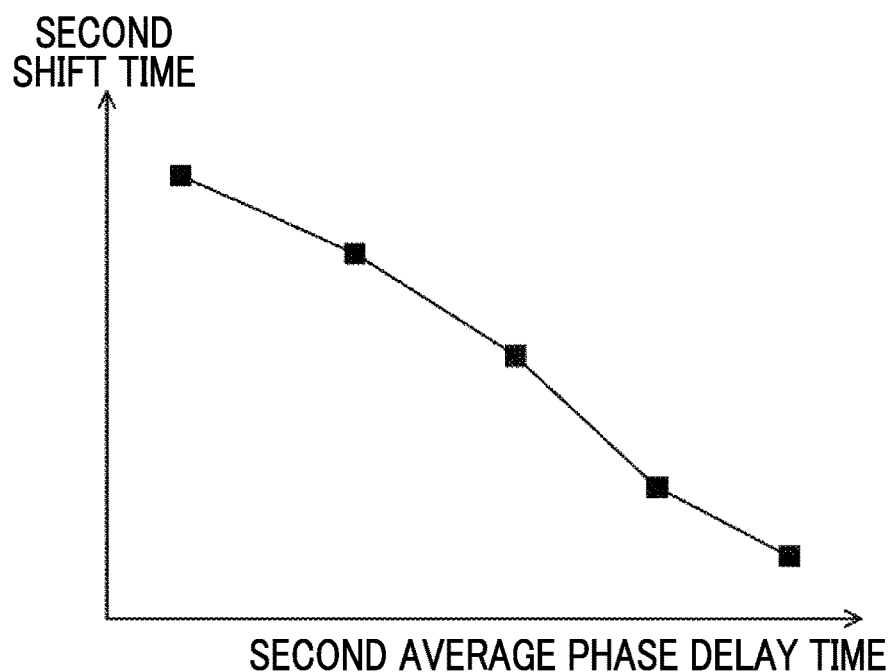
FIG. 15 is a diagram showing an example of a relationship between the second average phase delay time and a second shift time.

FIG. 14 shows an example of a relationship between the first average phase delay time and the first shift time $t3_1$, and FIG. 15 shows an example of a relationship between the second average phase delay time and the second shift time $t3_2$. As shown in FIG. 14, as the first average phase delay time is increased, the first shift time $t3_1$ is increased. As shown in FIG. 15, as the second average phase delay time is increased, the second shift time $t3_2$ is decreased.

Therefore, the third derivation portion 64 derives the first shift time $t3_1$ and the second shift time $t3_2$ as shift times corresponding to a preset condition. In the present embodiment, an example of applying the first average phase delay time and the second average phase delay time as this condition will be described. Instead of the first average phase delay time, for example, the first phase delay time in the most recent cycle may be used. In addition, instead of the second average phase delay time, for example, the second phase delay time in the most recent cycle may be used.

Specifically, the third derivation portion 64 derives the first shift time $t3_1$ corresponding to a first average phase delay time $t1_{avg}$ in accordance with the following function f1.

$t3_1 = f1(t1_{avg})$

Instead of the function f1, the third derivation portion 64 may derive the first shift time $t3_1$ corresponding to the first average phase delay time $t1_{avg}$ using a look-up table in which the first average phase delay time $t1_{avg}$ is associated with the first shift time $t3_1$.

In addition, the third derivation portion 64 derives the second shift time $t3_2$ corresponding to a second average phase delay time $t2_{avg}$ in accordance with the following function f2.

$t3_2 = f2(t2_{avg})$

Instead of the function f2, the third derivation portion 64 may derive the second shift time $t3_2$ corresponding to the second average phase delay time $t2_{avg}$ using a look-up table in which the second average phase delay time $t2_{avg}$ is associated with the second shift time $t3_2$.

The function f1 is a function obtained by calibration and is obtained by approximating a relationship between the first average phase delay time and the first shift time $t3_1$. The function f2 is a function obtained by calibration and is obtained by approximating a relationship between the second average phase delay time and the second shift time $t3_2$. Details of the calibration will be described later.

The first zero cross pulse output portion 65A generates a reference signal (hereinafter, referred to as a "first reference signal") based on the first driving signal, the first average phase delay time derived by the first derivation portion 63A, and the first shift time $t3_1$ derived by the third derivation portion 64. The first reference signal is a signal representing that the angle of the mirror portion 20 around the first axis $a_1$ is equal to a reference angle (hereinafter, referred to as a "first reference angle"). In the present embodiment, an example of applying zero as the first reference angle will be described. That is, the first zero cross pulse output portion 65A generates a zero cross pulse (hereinafter, referred to as a "first zero cross pulse") ZC1 as an example of the first reference signal based on the first driving signal, the first average phase delay time derived by the first derivation portion 63A, and the first shift time $t3_1$ derived by the third derivation portion 64. The first zero cross pulse output portion 65A is configured with a zero cross detection circuit. The first zero cross pulse is a zero cross signal representing that the angle of the mirror portion 20 around the first axis $a_1$ is zero.

Figure 16:
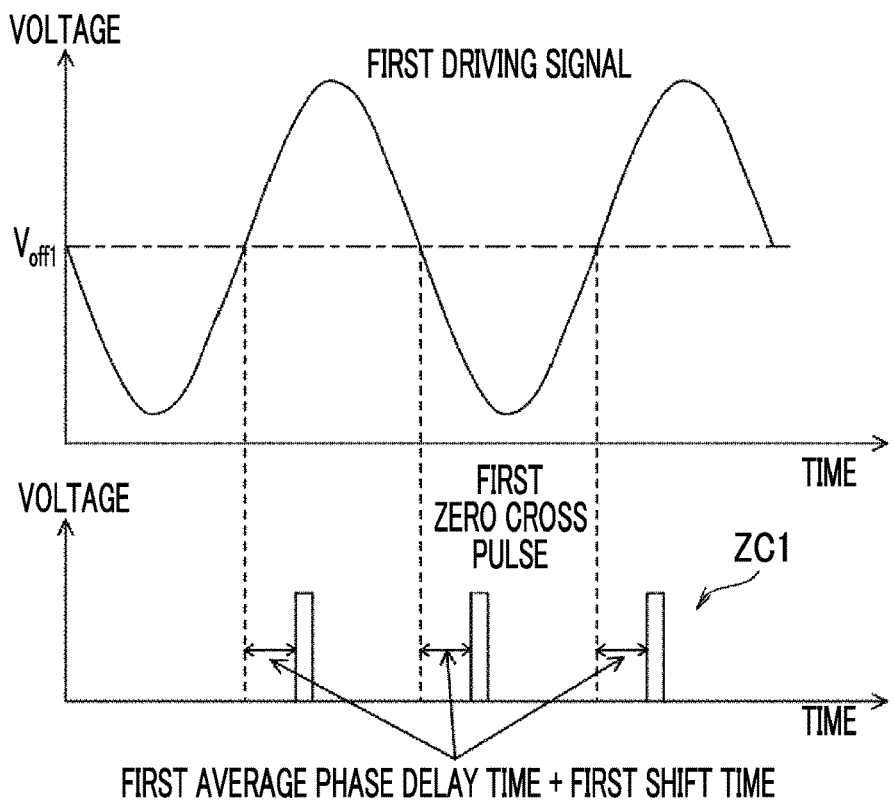
FIG. 16 is a diagram for describing generation processing of a first zero cross pulse.

As shown in FIG. 16, the first zero cross pulse output portion 65A generates the first zero cross pulse ZC1 at a timing after an elapse of an added time of the first average phase delay time and the first shift time $t3_1$ from a timing at which the first driving signal crosses zero (in the present embodiment, $V_{off1}$). The first zero cross pulse output portion 65A outputs the generated first zero cross pulse ZC1 to the light source driving portion 66.

In such a manner, the first shift time $t3_1$ is a shift time used for correcting a generation timing of the first reference signal. In addition, the first shift time $t3_1$ is a shift time of a point in time when the angle of the mirror portion 20 around the first axis $a_1$ is actually equal to the first reference angle with respect to a point in time (in the present embodiment, a point in time when the first angle detection signal S1c crosses zero) when the first angle detection signal S1c represents that the angle of the mirror portion 20 around the first axis $a_1$ is equal to the first reference angle (in the present embodiment, zero). In addition, here, the point in time when the first angle detection signal S1c represents that the angle of the mirror portion 20 around the first axis $a_1$ is equal to the first reference angle is a point in time after an elapse of the first average phase delay time from a point in time (in the present embodiment, a point in time when the first driving signal crosses $V_{off1}$) when the first driving signal represents that the angle of the mirror portion 20 around the first axis $a_1$ is equal to the first reference angle.

The second zero cross pulse output portion 65B generates a reference signal (hereinafter, referred to as a "second reference signal") based on the second driving signal, the second average phase delay time derived by the second derivation portion 63B, and the second shift time $t3_2$ derived by the third derivation portion 64. The second reference signal is a signal representing that the angle of the mirror portion 20 around the second axis $a_2$ is equal to a reference angle (hereinafter, referred to as a "second reference angle"). In the present embodiment, an example of applying zero as the second reference angle will be described. That is, the second zero cross pulse output portion 65B generates a zero cross pulse (hereinafter, referred to as a "second zero cross pulse") ZC2 as an example of the second reference signal based on the second driving signal, the second average phase delay time derived by the second derivation portion 63B, and the second shift time $t3_2$ derived by the third derivation portion 64. The second zero cross pulse output portion 65B is configured with a zero cross detection circuit. The second zero cross pulse is a zero cross signal representing that the angle of the mirror portion 20 around the second axis $a_2$ is zero.

Figure 17:
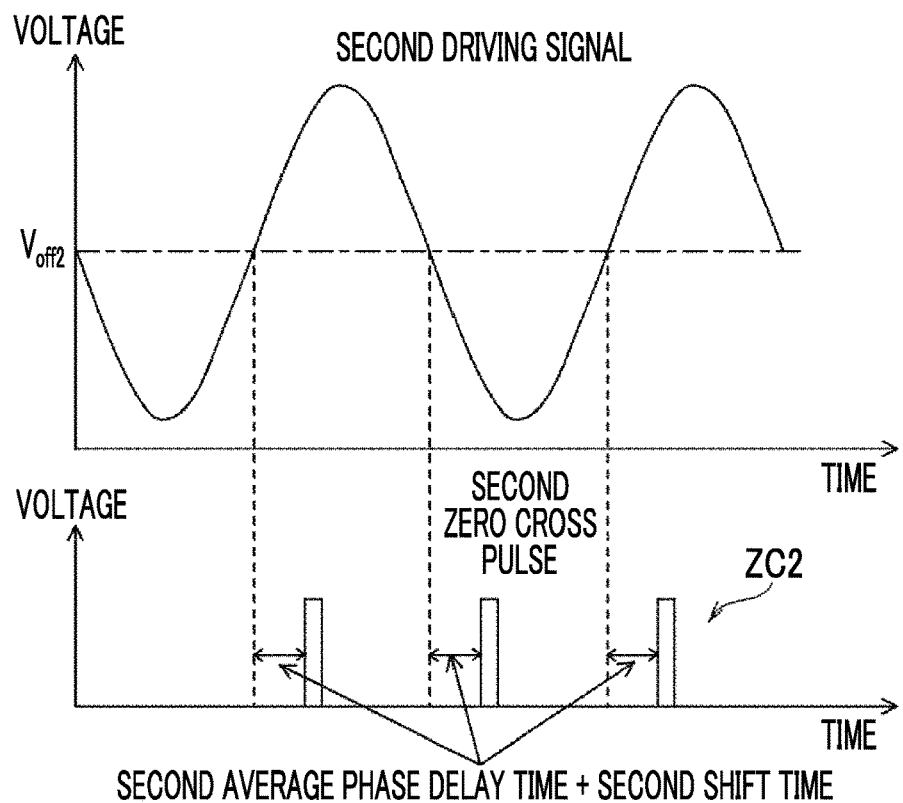
FIG. 17 is a diagram for describing generation processing of a second zero cross pulse.

As shown in FIG. 17, the second zero cross pulse output portion 65B generates the second zero cross pulse ZC2 at a timing after an elapse of an added time of the second average phase delay time and the second shift time $t3_2$ from a timing at which the second driving signal crosses zero (in the present embodiment, $V_{off2}$). The second zero cross pulse output portion 65B outputs the generated second zero cross pulse ZC2 to the light source driving portion 66.

In such a manner, the second shift time $t3_2$ is a shift time used for correcting a generation timing of the second reference signal. In addition, the second shift time $t3_2$ is a shift time of a point in time when the angle of the mirror portion 20 around the second axis $a_2$ is actually equal to the second reference angle with respect to a point in time (in the present embodiment, a point in time when the second angle detection signal S2c crosses zero) when the second angle detection signal S2c represents that the angle of the mirror portion 20 around the second axis $a_2$ is equal to the second reference angle (in the present embodiment, zero). In addition, here, the point in time when the second angle detection signal S2c represents that the angle of the mirror portion 20 around the second axis $a_2$ is equal to the second reference angle is a point in time after an elapse of the second average phase delay time from a point in time (in the present embodiment, a point in time when the second driving signal crosses $V_{off2}$) when the second driving signal represents that the angle of the mirror portion 20 around the second axis $a_2$ is equal to the second reference angle.

While the first zero cross pulse output portion 65A and the second zero cross pulse output portion 65B output the zero cross pulses using both of the point in time when the sinusoidal wave is zero from a negative value toward a positive value and the point in time when the sinusoidal wave is zero from a positive value toward a negative value, the present disclosure is not limited thereto. For example, the first zero cross pulse output portion 65A and the second zero cross pulse output portion 65B may output the zero cross pulses using any one of the point in time when the sinusoidal wave is zero from a negative value toward a positive value or the point in time when the sinusoidal wave is zero from a positive value toward a negative value.

The light source driving portion 66 drives the light source 3 based on, for example, drawing data supplied from an outside of the image drawing system 10. In addition, the light source driving portion 66 controls an irradiation timing of the laser light by the light source 3 so that the irradiation timing is synchronized with the first zero cross pulse ZC1 and the second zero cross pulse ZC2.

Next, a flow of first shift time derivation processing will be described with reference to FIG. 18. For example, the flow of first shift time derivation processing is executed at a predetermined time interval during the drawing of the image by the image drawing system 10. This time interval may be, for example, a time interval corresponding to one cycle of the first driving signal, a time interval corresponding to a plurality of cycles, or a preset time interval regardless of the cycle.

Figure 18:
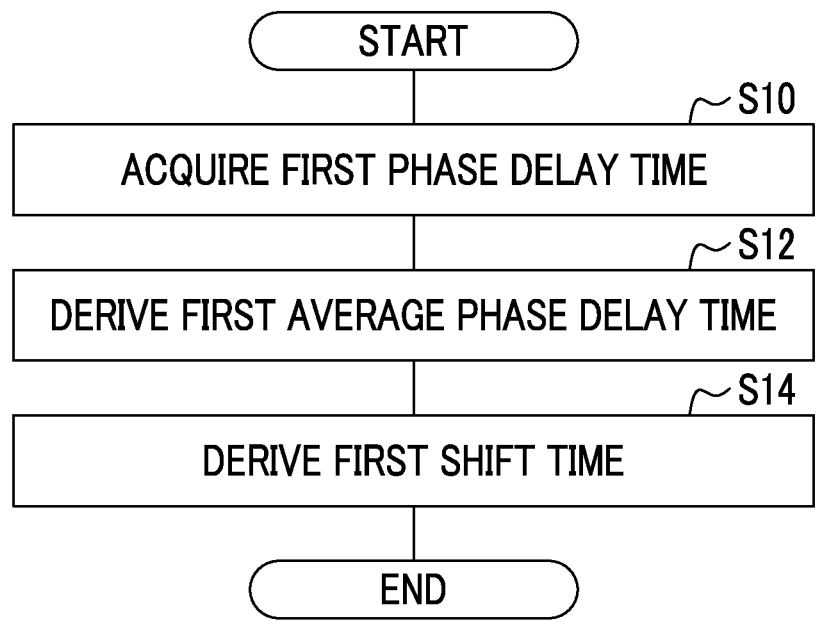
FIG. 18 is a flowchart showing an example of first shift time derivation processing.

In step S10 in FIG. 18, for each cycle, the first derivation portion 63A acquires the first phase delay time from the point in time when the first driving signal is zero to the point in time when the first angle detection signal S1c is zero in the corresponding cycle. In step S12, the first derivation portion 63A derives the first average phase delay time by averaging the first phase delay time in the most recent plurality of cycles acquired in step S10.

In step S14, the third derivation portion 64 derives the first shift time $t3_1$ corresponding to the first average phase delay time derived in step S12 in accordance with the function f1. In a case where the processing in step S14 is finished, the first shift time derivation processing is finished. The first average phase delay time and the first shift time $t3_1$ are updated by periodically executing the first shift time derivation processing during the drawing of the image.

Next, a flow of second shift time derivation processing will be described with reference to FIG. 19. For example, the second shift time derivation processing is executed at a predetermined time interval during the drawing of the image by the image drawing system 10. This time interval may be, for example, a time interval corresponding to one cycle of the second driving signal, a time interval corresponding to a plurality of cycles, or a preset time interval regardless of the cycle.

Figure 19:
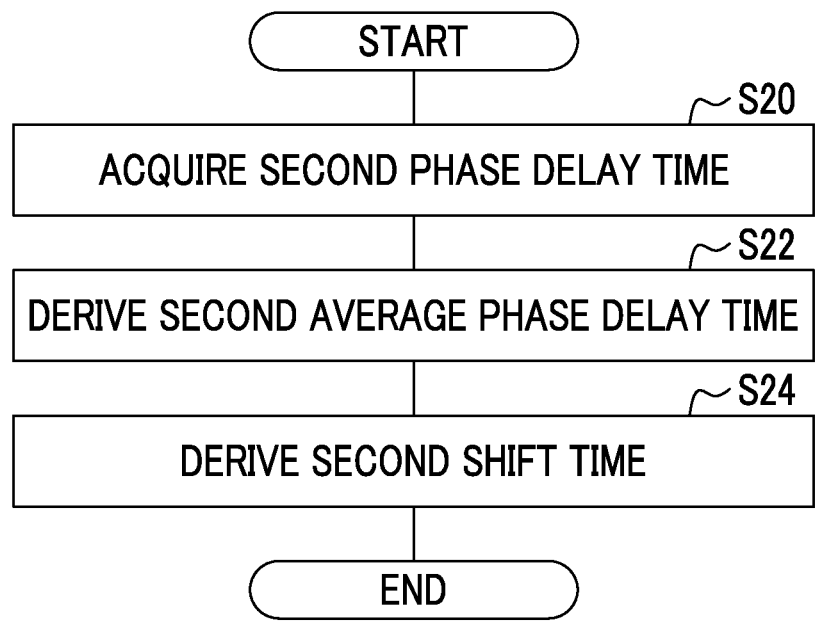
FIG. 19 is a flowchart showing an example of second shift time derivation processing.

In step S20 in FIG. 19, for each cycle, the second derivation portion 63B acquires the second phase delay time from the point in time when the second driving signal is zero to the point in time when the second angle detection signal S2c is zero in the corresponding cycle. In step S22, the second derivation portion 63B derives the second average phase delay time by averaging the second phase delay time in the most recent plurality of cycles acquired in step S20.

In step S24, the third derivation portion 64 derives the second shift time $t3_2$ corresponding to the second average phase delay time derived in step S22 in accordance with the function f2. In a case where the processing in step S24 is finished, the second shift time derivation processing is finished. The second average phase delay time and the second shift time $t3_2$ are updated by periodically executing the second shift time derivation processing during the drawing of the image.

Next, a flow of first zero cross pulse generation processing will be described with reference to FIG. 20. For example, the first zero cross pulse generation processing is executed during the drawing of the image by the image drawing system 10.

Figure 20:
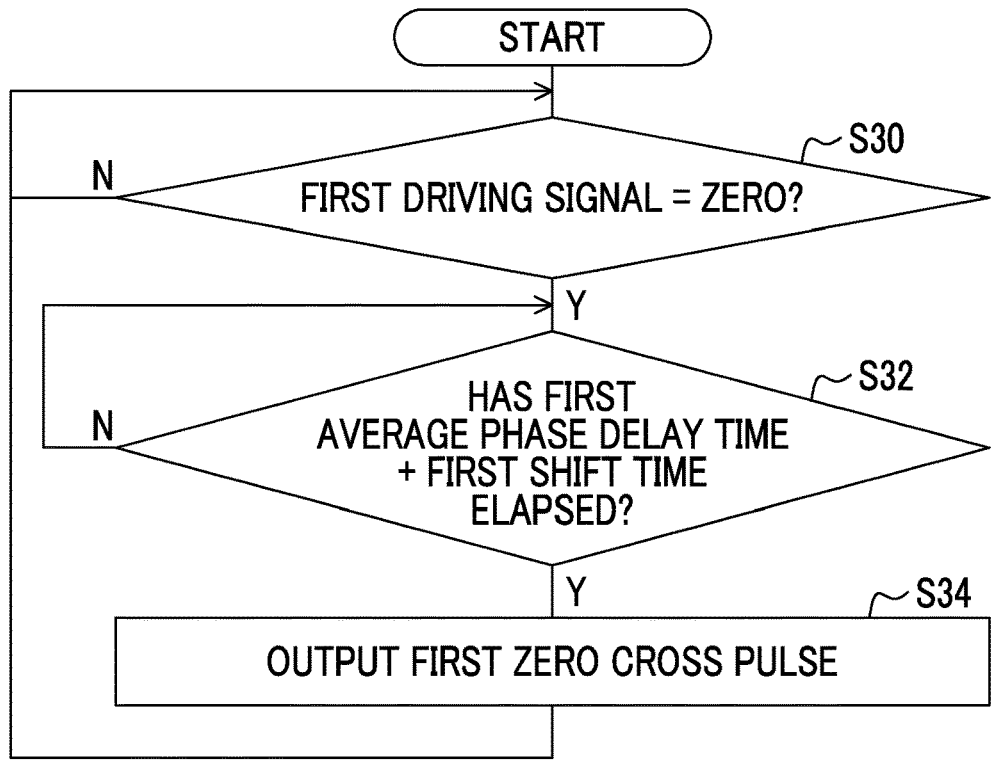
FIG. 20 is a flowchart showing an example of first zero cross pulse generation processing.

In step S30 in FIG. 20, the first zero cross pulse output portion 65A determines whether or not the first driving signal is zero. In a case where this determination results in a positive determination, the processing transitions to step S32. In a case where a negative determination is made, step S30 is executed again.

In step S32, the first zero cross pulse output portion 65A waits for the elapse of the added time of the first average phase delay time and the first shift time $t3_1$ derived by the first shift time derivation processing from the timing at which the first driving signal is zero in step S30. In a case where the added time of the first average phase delay time and the first shift time $t3_1$ elapses from the timing at which the first driving signal is zero in step S30, the determination in step S32 results in a positive determination, and the processing transitions to step S34.

In step S34, the first zero cross pulse output portion 65A generates the first zero cross pulse ZC1 and outputs the generated first zero cross pulse ZC1 to the light source driving portion 66. In a case where the processing in step S34 is finished, the processing returns to step S30. In a case where drawing processing of the image by the image drawing system 10 is finished, the first zero cross pulse generation processing is finished.

Next, a flow of second zero cross pulse generation processing will be described with reference to FIG. 21. For example, the second zero cross pulse generation processing is executed during the drawing of the image by the image drawing system 10.

Figure 21:
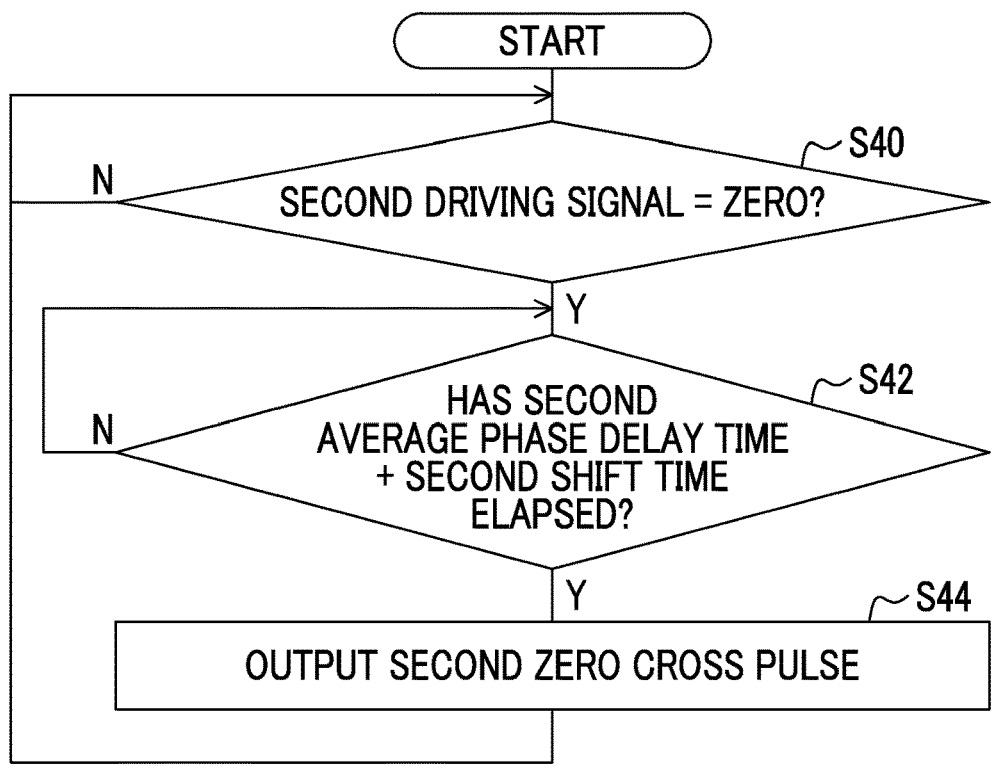
FIG. 21 is a flowchart showing an example of second zero cross pulse generation processing.

In step S40 in FIG. 21, the second zero cross pulse output portion 65B determines whether or not the second driving signal is zero. In a case where this determination results in a positive determination, the processing transitions to step S42. In a case where a negative determination is made, step S40 is executed again.

In step S42, the second zero cross pulse output portion 65B waits for the elapse of the added time of the second average phase delay time and the second shift time $t3_2$ derived by the second shift time derivation processing from the timing at which the second driving signal is zero in step S40. In a case where the added time of the second average phase delay time and the second shift time $t3_2$ elapses from the timing at which the second driving signal is zero in step S40, the determination in step S42 results in a positive determination, and the processing transitions to step S44.

In step S44, the second zero cross pulse output portion 65B generates the second zero cross pulse ZC2 and outputs the generated second zero cross pulse ZC2 to the light source driving portion 66. In a case where the processing in step S44 is finished, the processing returns to step S40. In a case where the drawing processing of the image by the image drawing system 10 is finished, the second zero cross pulse generation processing is finished.

Figure 22:
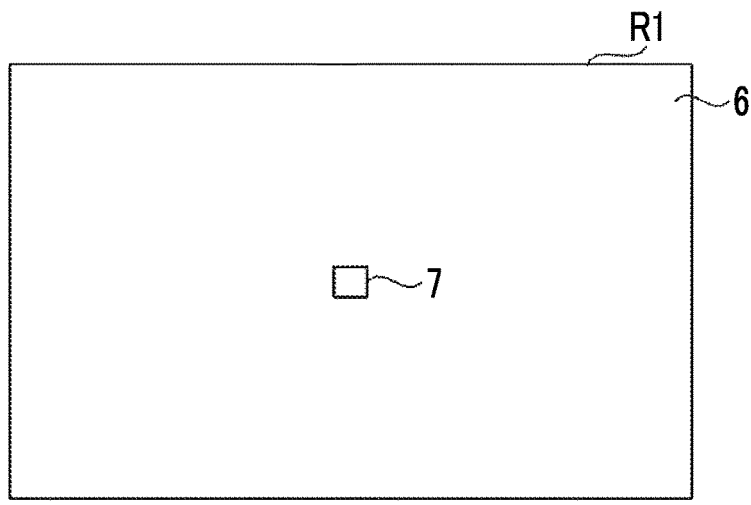
FIG. 22 is a diagram for describing an arrangement position of a photodetector in calibration.

Next, processing of obtaining the functions f1 and f2 by the calibration will be described. FIG. 22 is a diagram for describing an arrangement position of the photodetector 7 in the calibration. The photodetector 7 is provided at a position at which the reflected light from the mirror portion 20 can be received. In the present embodiment, as shown in FIG. 22 as an example, one photodetector 7 is provided at a center of a region (hereinafter, referred to as a "drawing region") R1 in which the image is drawn by the reflected light from the mirror portion 20. In a state where the mirror portion 20 is at a standstill, that is, in a case where the angle of the mirror portion 20 around the first axis $a_1$ and the angle of the mirror portion 20 around the second axis $a_2$ are zero, the photodetector 7 is irradiated with the light beam L reflected from the mirror portion 20. In this case, the photodetector 7 outputs a signal (hereinafter, referred to as an "irradiation signal") representing that the irradiation is performed with the light beam L to the driving controller 5.

Figure 25:
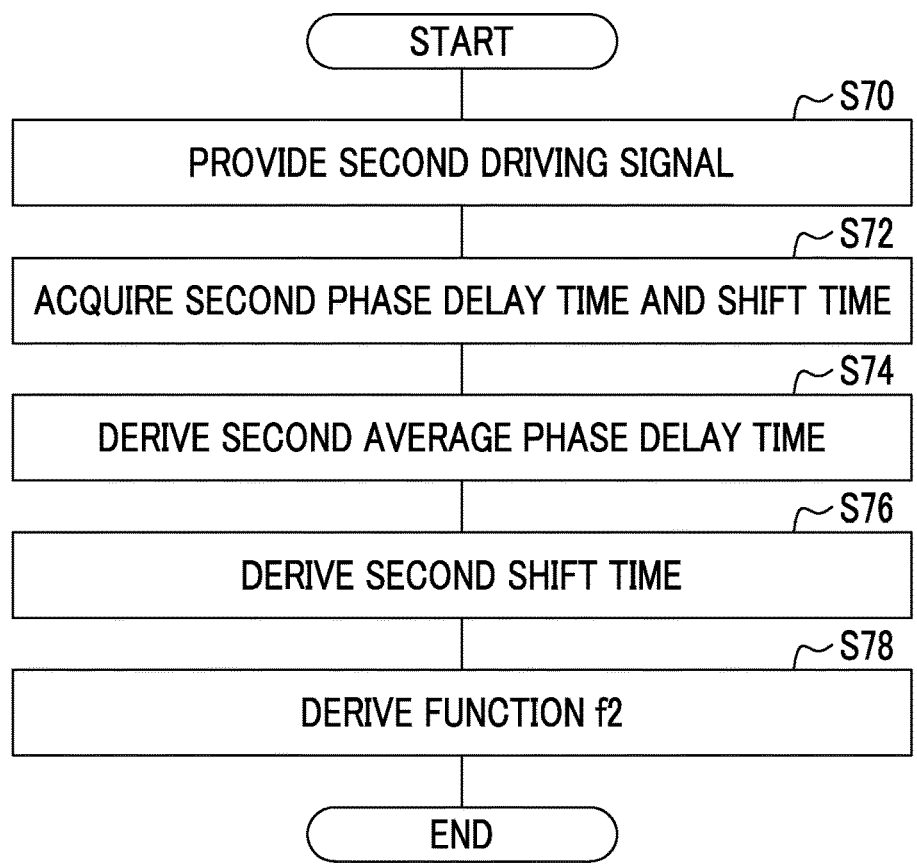
FIG. 25 is a flowchart showing an example of second calibration processing.

The optical scanning device 2 according to the present embodiment has a shift time derivation mode in which the first shift time $t3_1$ and the second shift time $t3_2$ are derived. First calibration processing shown in FIG. 23 and second calibration processing shown in FIG. 25 are executed by executing the shift time derivation mode in the calibration. Examples of an execution timing of the calibration include when the optical scanning device 2 is started, and a timing at which an instruction to execute the calibration is input by a user. In addition, the execution timing of the calibration may be before the optical scanning device 2 is shipped from a factory. In this case, for example, data obtained by the calibration is stored in a non-volatile storage portion comprised in the driving controller 5. In addition, in this case, the photodetector 7 may not be included in the image drawing system 10 in a user location that is a shipment destination of the optical scanning device 2. In addition, during the execution of the first calibration processing and the second calibration processing, it is assumed that the reflecting surface 20A of the mirror portion 20 is continuously irradiated with the light beam L from the light source 3.

Figure 23:
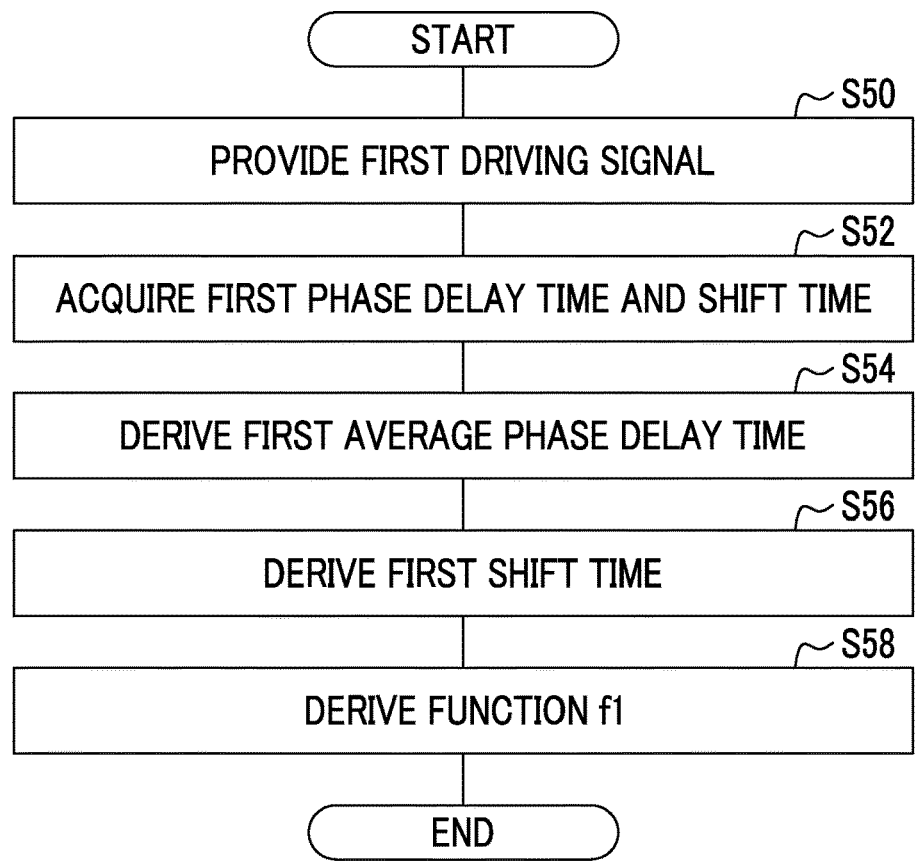
FIG. 23 is a flowchart showing an example of first calibration processing.

In step S50 in FIG. 23, as described above, the first driving signal generation portion 60A generates the first driving signal and provides the generated first driving signal to the pair of first actuators 31 through the first phase shift portion 62A. That is, in the first calibration processing, the mirror portion 20 is caused to swing around only the first axis $a_1$ and not swing around the second axis $a_2$.

Figure 24:
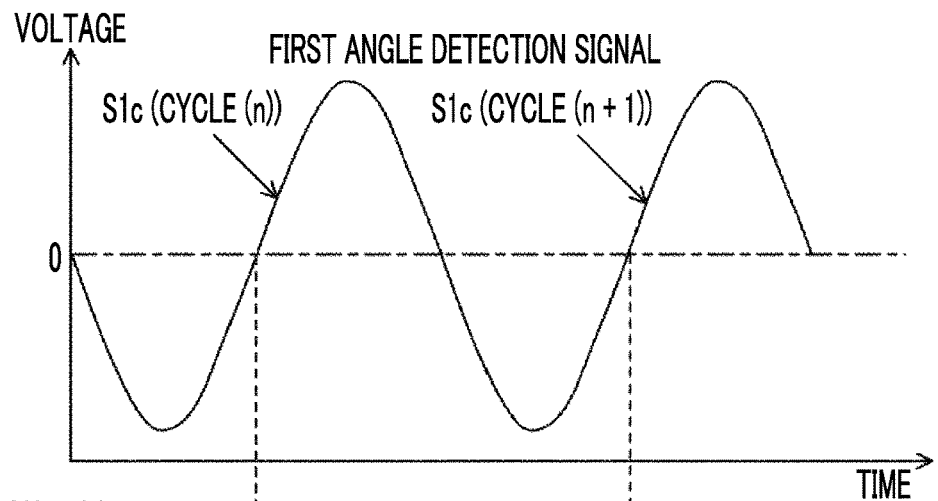
FIG. 24 is a diagram for describing the first calibration processing.

In step S52, for each cycle, the first derivation portion 63A acquires the first phase delay time from the point in time when the first driving signal is zero to the point in time when the first angle detection signal S1c is zero in the corresponding cycle. At this point, as shown in FIG. 24 as an example, for each cycle, the first derivation portion 63A also acquires a shift time t4 from the point in time when the first angle detection signal S1c is zero to a point in time when the irradiation signal is input from the photodetector 7. The point in time when the irradiation signal is input represents a point in time when the output signal of the photodetector 7 represents that the angle of the mirror portion 20 around the first axis $a_1$ is zero.

In step S54, the first derivation portion 63A derives the first average phase delay time by averaging the first phase delay time in the most recent plurality of cycles acquired in step S52. In step S56, the first derivation portion 63A derives the first shift time $t3_1$ by averaging the shift time t4 in the most recent plurality of cycles acquired in step S52.

The above processing from step S50 to step S56 is executed a plurality of times while the first driving frequency is changed. In a case where the first driving frequency is changed, the first average phase delay time and the first shift time $t3_1$ also have different values. That is, since a plurality of combinations of the first average phase delay time and the first shift time $t3_1$ are obtained, a relationship between the first average phase delay time and the first shift time $t3_1$ shown in FIG. 14 as an example is obtained.

In step S58, the third derivation portion 64 derives the function f1 by approximating the obtained relationship between the first average phase delay time and the first shift time $t3_1$. The function f1 is used in step S14 of the first shift time derivation processing (see FIG. 18). The third derivation portion 64 may store the obtained relationship between the first average phase delay time and the first shift time $t3_1$ as a look-up table. In a case where the processing in step S58 is finished, the first calibration processing is finished.

In step S70 in FIG. 25, as described above, the second driving signal generation portion 60B generates the second driving signal and provides the generated second driving signal to the pair of second actuators 32 through the second phase shift portion 62B. That is, in the second calibration processing, the mirror portion 20 is caused to swing around only the second axis $a_2$ and not swing around the first axis $a_1$.

Figure 26:
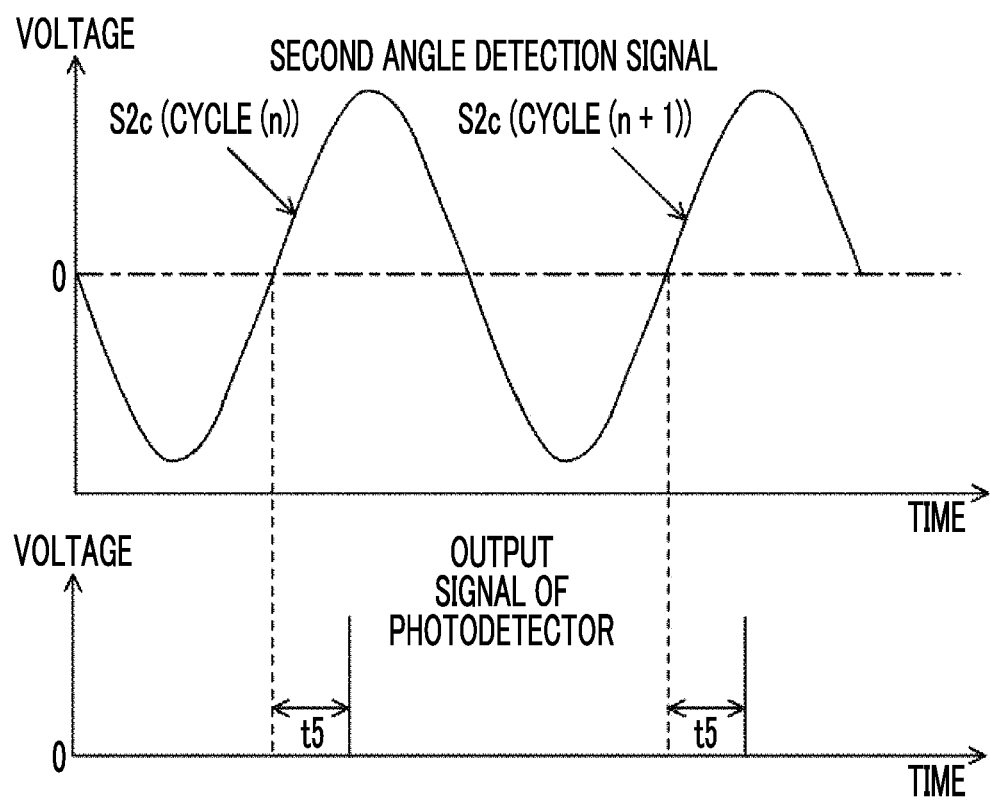
FIG. 26 is a diagram for describing the second calibration processing.

In step S72, for each cycle, the second derivation portion 63B acquires the second phase delay time from the point in time when the second driving signal is zero to the point in time when the second angle detection signal S2c is zero in the corresponding cycle. At this point, as shown in FIG. 26 as an example, for each cycle, the second derivation portion 63B also acquires a shift time t5 from the point in time when the second angle detection signal S2c is zero to the point in time when the irradiation signal is input from the photodetector 7. The point in time when the irradiation signal is input represents a point in time when the output signal of the photodetector 7 represents that the angle of the mirror portion 20 around the second axis $a_2$ is zero.

In step S74, the second derivation portion 63B derives the second average phase delay time by averaging the second phase delay time in the most recent plurality of cycles acquired in step S72. In step S76, the second derivation portion 63B derives the second shift time $t3_2$ by averaging the shift time t5 in the most recent plurality of cycles acquired in step S72.

The above processing from step S70 to step S76 is executed a plurality of times while the second driving frequency is changed. In a case where the second driving frequency is changed, the second average phase delay time and the second shift time $t3_2$ also have different values. That is, since a plurality of combinations of the second average phase delay time and the second shift time $t3_2$ are obtained, a relationship between the second average phase delay time and the second shift time $t3_2$ shown in FIG. 15 as an example is obtained.

In step S78, the third derivation portion 64 derives the function f2 by approximating the obtained relationship between the second average phase delay time and the second shift time $t3_2$. The function f2 is used in step S24 of the second shift time derivation processing (see FIG. 19). The third derivation portion 64 may store the obtained relationship between the second average phase delay time and the second shift time $t3_2$ as a look-up table. In a case where the processing in step S78 is finished, the second calibration processing is finished.

As described above, according to the present embodiment, sensing accuracy of a timing at which the angle of the mirror portion 20 is equal to the reference angle by the optical scanning device 2 can be improved using the photodetector 7. Consequently, a decrease in image quality of the drawn image can be suppressed.

The configuration of the MMD 4 shown in the embodiment is an example. The configuration of the MMD 4 can be variously modified. For example, the first actuators 31 that cause the mirror portion 20 to swing around the first axis $a_1$ may be arranged in the second movable frame 24, and the second actuators 32 that cause the mirror portion 20 to swing around the second axis $a_2$ may be arranged in the first movable frame 22.

Figure 27:
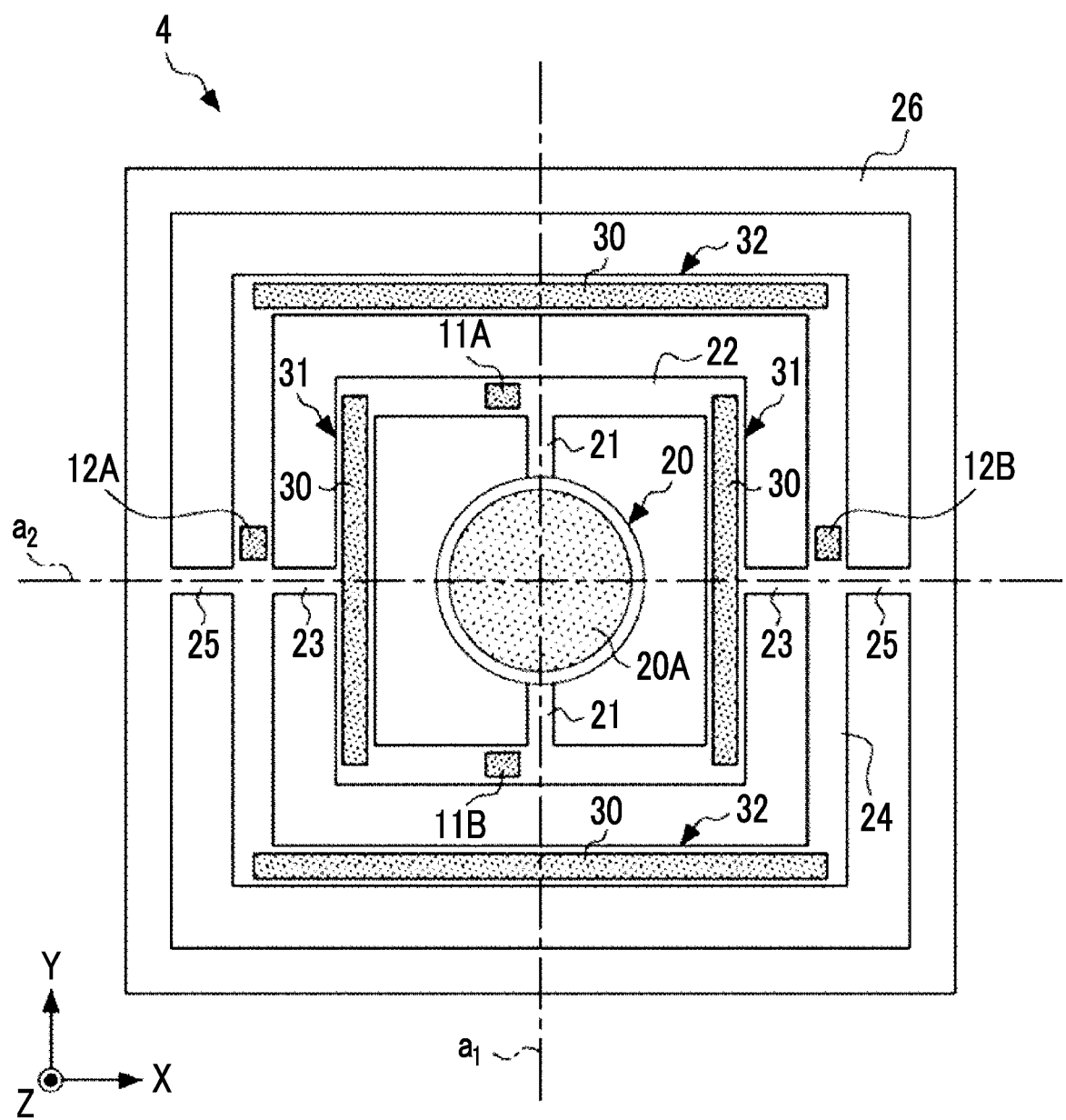
FIG. 27 is a plan view of a micromirror device according to a modification example.

In addition, in the embodiment, while a case where the pair of first angle detection sensors 11A and 11B are arranged at positions that face each other with the first axis $a_1$ interposed therebetween is described, the present disclosure is not limited thereto. For example, as shown in FIG. 27, the pair of first angle detection sensors 11A and 11B may be arranged at positions that face each other with the second axis $a_2$ interposed therebetween. In the example in FIG. 27, each of the pair of first angle detection sensors 11A and 11B is arranged near the first support portions 21 on the first movable frame 22. The first angle detection sensor 11A is arranged near the first support portion 21 connected to one side of the mirror portion 20. The first angle detection sensor 11B is arranged near the first support portion 21 connected to the other side of the mirror portion 20. Accordingly, the pair of first angle detection sensors 11A and 11B are arranged at positions that face each other with the second axis $a_2$ interposed therebetween and face each other with the mirror portion 20 interposed therebetween. In addition, the pair of first angle detection sensors 11A and 11B are arranged at positions that are shifted in the same direction (in the example in FIG. 27, the −X direction) from the first axis $a_1$.

As in the embodiment, in a case where the pair of first angle detection sensors 11A and 11B are arranged at positions that face each other with the first axis $a_1$ interposed therebetween, the vibration noise can be removed by subtracting one of the output signals of both of the first angle detection sensors 11A and 11B from the other. On the other hand, as in this form example, in a case where the pair of first angle detection sensors 11A and 11B are arranged at positions that face each other with the second axis $a_2$ interposed therebetween, the vibration noise can be removed by adding the output signals of both of the first angle detection sensors 11A and 11B.

Figure 28:
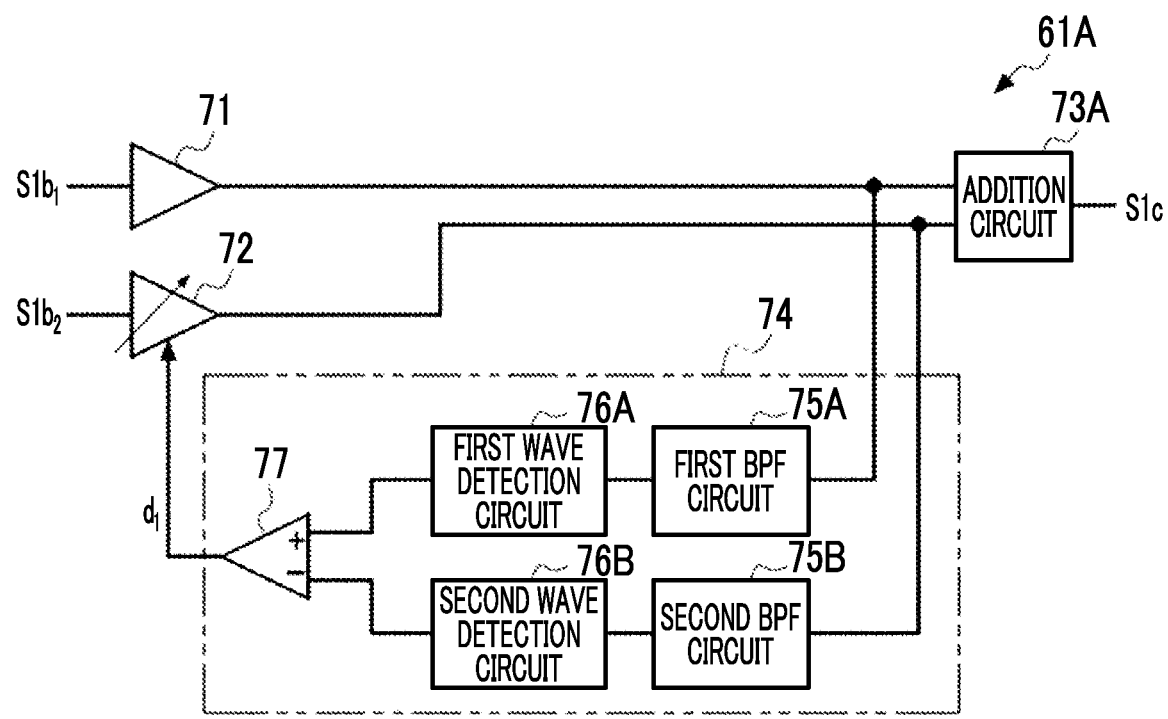
FIG. 28 is a circuit diagram showing a configuration of a first signal processing portion according to the modification example.

An example of a configuration of the first signal processing portion 61A in this form example is shown in FIG. 28. As shown in FIG. 28, in this form example, the first signal processing portion 61A includes an addition circuit 73A instead of the subtraction circuit 73. The addition circuit 73A outputs a value obtained by adding the signal $S1b_1$ input from the first angle detection sensor 11A through the buffer amplifier 71 to the signal $S1b_2$ input from the first angle detection sensor 11B through the variable gain amplifier 72.

In addition, in the embodiment, while a case where the pair of second angle detection sensors 12A and 12B are arranged at positions that face each other with the second axis $a_2$ interposed therebetween is described, the present disclosure is not limited thereto. For example, as shown in FIG. 27, the pair of second angle detection sensors 12A and 12B may be arranged at positions that face each other with the first axis $a_1$ interposed therebetween. In the example in FIG. 27, each of the pair of second angle detection sensors 12A and 12B is arranged near the second support portions 23 on the second movable frame 24. The second angle detection sensor 12A is arranged near the second support portion 23 connected to one side of the first movable frame 22. The second angle detection sensor 12B is arranged near the second support portion 23 connected to the other side of the first movable frame 22. Accordingly, the pair of second angle detection sensors 12A and 12B are arranged at positions that face each other with the first axis $a_1$ interposed therebetween and face each other with the mirror portion 20 and the first movable frame 22 interposed therebetween. In addition, the pair of second angle detection sensors 12A and 12B are arranged at positions that are shifted in the same direction (in the example in FIG. 27, the +Y direction) from the second axis $a_2$.

As in the embodiment, in a case where the pair of second angle detection sensors 12A and 12B are arranged at positions that face each other with the second axis $a_2$ interposed therebetween, the vibration noise can be removed by subtracting one of the output signals of both of the second angle detection sensors 12A and 12B from the other. On the other hand, as in this form example, in a case where the pair of second angle detection sensors 12A and 12B are arranged at positions that face each other with the first axis $a_1$ interposed therebetween, the vibration noise can be removed by adding the output signals of both of the second angle detection sensors 12A and 12B. A configuration of the second signal processing portion 61B in this form example can be implemented by the same configuration as the first signal processing portion 61A shown in FIG. 28 and thus, will not be described.

In addition, in the embodiment, a form of providing any one of the pair of first angle detection sensors 11A and 11B in the MMD 4 may be applied. Similarly, a form of providing any one of the pair of second angle detection sensors 12A and 12B in the MMD 4 may be applied.

Figure 29:
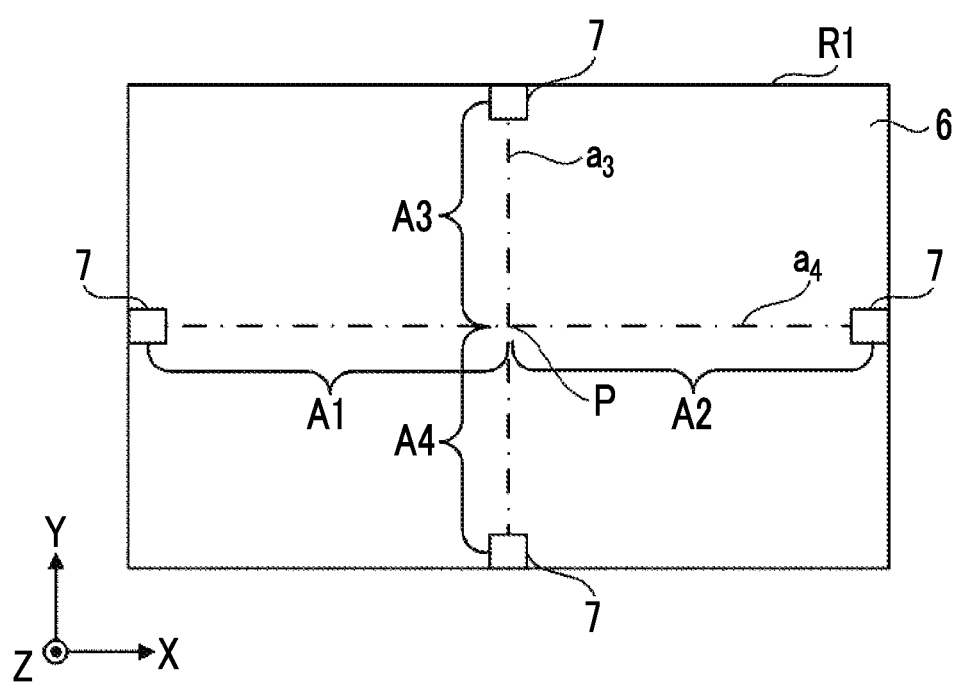
FIG. 29 is a diagram showing an arrangement position of a photodetector according to the modification example.

In addition, in the embodiment, while a case of providing one photodetector 7 at the center of the drawing region R1 in the calibration is described, the present disclosure is not limited thereto. As shown in FIG. 29 as an example, one photodetector 7 may be provided in each end part on an axis $a_3$ corresponding to the first axis $a_1$ and each end part on an axis $a_4$ corresponding to the second axis $a_2$ in a region (hereinafter, referred to as a "drawable region") in which the image is drawable by the reflected light from the mirror portion 20. In FIG. 29, an example of applying the drawing region R1 as the drawable region is shown. In this case, the shift times t4 and t5 are derived based on distances A1 to A4 from a position P (in the example in FIG. 29, the center of the drawing region R1) irradiated with the light beam L reflected from the mirror portion 20 to the photodetectors 7 in a state where the mirror portion 20 is at a standstill, and an input timing of the irradiation signal from the photodetector 7.

Figure 30:
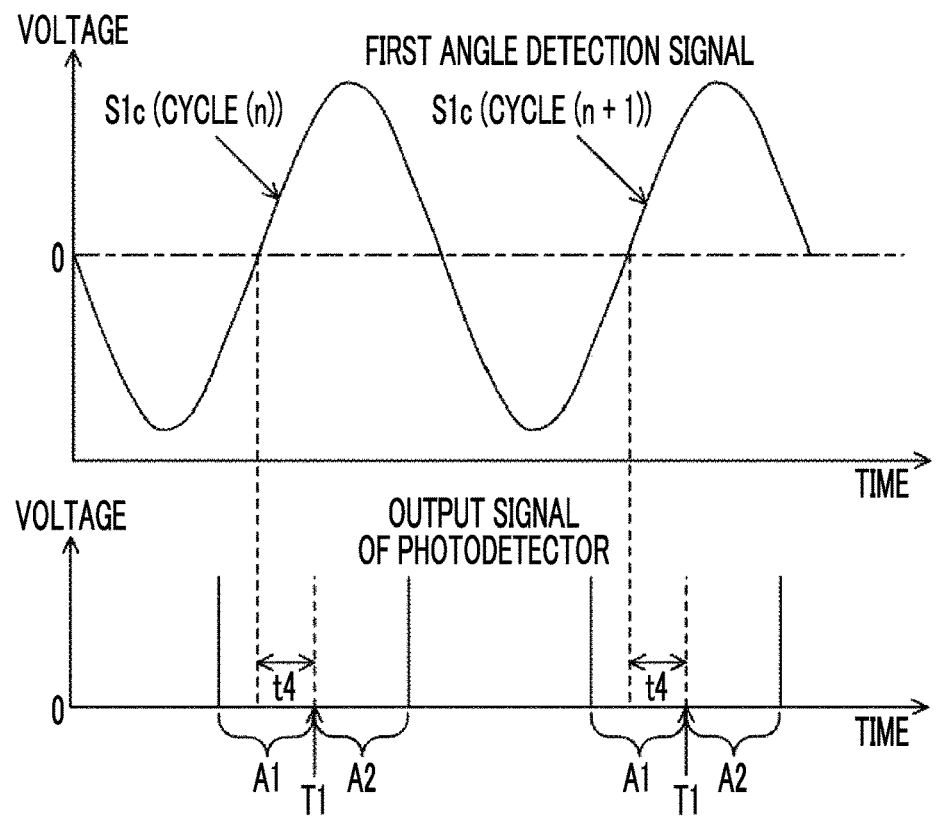
FIG. 30 is a diagram for describing first calibration processing according to the modification example.

Specifically, in step S52 of the first calibration processing, as shown in FIG. 30 as an example, the first derivation portion 63A derives a point in time T1 when the angle of the mirror portion 20 around the first axis $a_1$ is zero, based on a ratio of the distances A1 and A2 from the position P to each photodetector 7 on the axis $a_4$ and a point in time when the irradiation signal is input from each photodetector 7 on the axis $a_4$. In the example in FIG. 29, the distance A1 is equal to the distance A2. Thus, the point in time T1 is a center point in time between the points in time when the irradiation signal is input from each photodetector 7 on the axis $a_4$. The first derivation portion 63A uses a time from the point in time when the first angle detection signal S1c is zero to the derived point in time T1 as the shift time t4. The point in time T1 represents a point in time when the output signal of the photodetector 7 represents that the angle of the mirror portion 20 around the first axis $a_1$ is zero.

Figure 31:
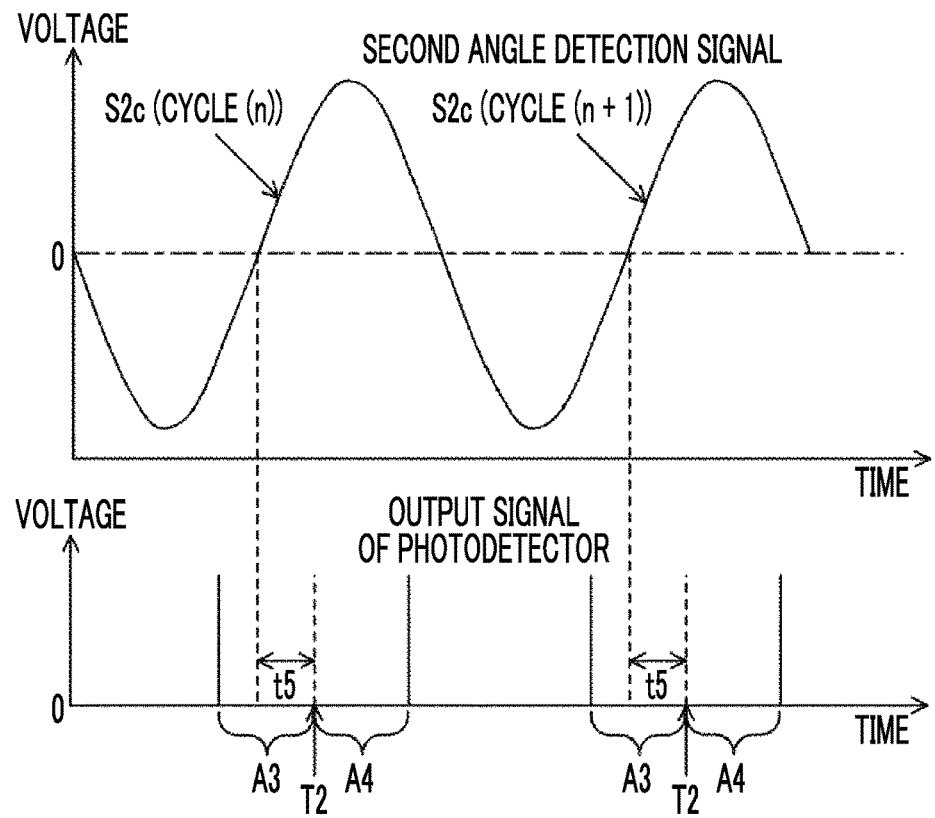
FIG. 31 is a diagram for describing second calibration processing according to the modification example.

Similarly, in step S72 of the second calibration processing, as shown in FIG. 31 as an example, the second derivation portion 63B derives a point in time T2 when the angle of the mirror portion 20 around the second axis $a_2$ is zero, based on a ratio of the distances A3 and A4 from the position P to each photodetector 7 on the axis $a_3$ and a point in time when the irradiation signal is input from each photodetector 7 on the axis $a_3$. In the example in FIG. 29, the distance A3 is equal to the distance A4. Thus, the point in time T2 is a center point in time between the points in time when the irradiation signal is input from each photodetector 7 on the axis $a_3$. The second derivation portion 63B uses a time from the point in time when the second angle detection signal S2c is zero to the derived point in time T2 as the shift time t5. The point in time T2 represents a point in time when the output signal of the photodetector 7 represents that the angle of the mirror portion 20 around the second axis $a_2$ is zero.

The mirror portion 20 may be capable of reflecting the light beam L in a wider region than the drawing region R1 based on the drawing data. That is, as specifications of the device, the mirror portion 20 may be capable of drawing the image in a state where the first deflection angle $\theta_1$ and the second deflection angle $\theta_2$ are set to be larger than when the image is drawn in the drawing region R1 based on the drawing data. In this case, as shown in FIG. 32 as an example, one photodetector 7 may be provided in each end part on the axis $a_3$ and each end part on the axis $a_4$ in a drawable region R2 outside the drawing region R1.

In addition, as shown in FIG. 33 as an example, one photodetector 7 may be provided at each of two points other than each end part on the axis $a_3$ corresponding to the first axis $a_1$ and each of two points other than each end part on the axis $a_4$ corresponding to the second axis $a_2$ in the drawable region. In FIG. 33, an example of applying the drawing region R1 as the drawable region is shown. Even in this case, in the same manner as in a case where the photodetectors 7 are provided in the end parts, the first derivation portion 63A can derive the point in time T1 when the angle of the mirror portion 20 around the first axis $a_1$ is zero, based on the ratio of the distances A1 and A2 from the position P to each photodetector 7 on the axis $a_4$ and the point in time when the irradiation signal is input from each photodetector 7 on the axis $a_4$. In addition, in this case, in the same manner as in a case where the photodetectors 7 are provided in the end parts, the second derivation portion 63B can derive the point in time T2 when the angle of the mirror portion 20 around the second axis $a_2$ is zero, based on the ratio of the distances A3 and A4 from the position P to each photodetector 7 on the axis $a_3$ and the point in time when the irradiation signal is input from each photodetector 7 on the axis $a_3$.

In addition, in the embodiment, the photodetector 7 may be in a non-driven state during the drawing of the image. In this case, power supply to the photodetector 7 can be stopped. Consequently, power consumption can be reduced.

In addition, in the embodiment, while a case of deriving the first average phase delay time and the second average phase delay time at a time of drawing the image is described, the present disclosure is not limited thereto. A form of acquiring the first average phase delay time and the second average phase delay time by executing an average phase delay time derivation mode in which the first average phase delay time and the second average phase delay time are derived in the calibration may be applied. In this case, the first average phase delay time and the second average phase delay time acquired in advance in the calibration are used in the generation of the first zero cross pulse ZC1 and the second zero cross pulse ZC2. Examples of the execution timing of the calibration in this case include when the MMD 4 is started, and the timing at which the instruction to execute the calibration is input by the user.

In addition, in the embodiment, while a case where the third derivation portion 64 derives the first shift time $t3_1$ corresponding to the first average phase delay time in accordance with the function f1 is described, the present disclosure is not limited thereto. FIG. 34 shows an example of the relationship between the first average phase delay time and the first shift time $t3_1$ in a case where a driving voltage V1 of the first driving signal is differently set. For example, the driving voltage V1 of the first driving signal corresponds to an amplitude of the first driving signal. A solid line in FIG. 34 shows a case where the driving voltage V1 is higher than a broken line. As shown in FIG. 34, as the driving voltage V1 is increased, the first shift time $t3_1$ is increased. In FIG. 34, while the relationship between the first average phase delay time and the first shift time $t3_1$ in a case of differently setting the driving voltage V1 is shown, the first shift time $t3_1$ changes in accordance with not only the driving voltage V1 of the first driving signal but also the first driving frequency.

Therefore, the third derivation portion 64 may further derive the first shift time $t3_1$ corresponding to a first driving frequency F1 and a driving voltage V1 of the first driving signal in accordance with a function f3 shown as follows.

$t3_1 = f3(t1_{avg}, F1, V1)$

Similarly, the third derivation portion 64 may further derive the second shift time $t3_2$ corresponding to a second driving frequency F2 and a driving voltage V2 of the second driving signal in accordance with a function f4 shown as follows.

$t3_2 = f4(t2_{avg}, F2, V2)$

In addition, the third derivation portion 64 may further derive the first shift time $t3_1$ and the second shift time $t3_2$ corresponding to an ambient temperature T in accordance with functions f5 and f6 shown as follows. In this case, a temperature sensor that measures the ambient temperature is provided in the MMD 4.

$t3_1 = f5(t1_{avg}, T)$
$t3_2 = f6(t2_{avg}, T)$

In addition, the third derivation portion 64 may further derive the first shift time $t3_1$ corresponding to the first driving frequency F1, the driving voltage V1 of the first driving signal, and the ambient temperature T in accordance with a function f7 shown as follows.

$t3_1 = f7(t1_{avg}, F1, V1, T)$

Similarly, the third derivation portion 64 may further derive the second shift time $t3_2$ corresponding to the second driving frequency F2, the driving voltage V2 of the second driving signal, and the ambient temperature T in accordance with a function f8 shown as follows.

$$t3_2 = f8(t2_{avg}, F2, V2, T)$$

In the functions f3 and f7, only one of the first driving frequency F1 or the driving voltage V1 of the first driving signal may be used. In addition, in the functions f4 and f8, only one of the second driving frequency F2 or the driving voltage V2 of the second driving signal may be used.

In addition, a hardware configuration of the driving controller 5 can be variously modified. The driving controller 5 can be configured using at least one of an analog operation circuit or a digital operation circuit. The driving controller 5 may be configured with one processor or may be configured with a combination of two or more processors of the same type or different types. Examples of the processor include a central processing unit (CPU), a programmable logic device (PLD), and a dedicated electric circuit. As is well known, the CPU is a general-purpose processor that executes software (program) to function as various processing portions. The PLD is a processor such as a field programmable gate array (FPGA) that has a circuit configuration changeable after manufacturing. The dedicated electric circuit is a processor such as an application specific integrated circuit (ASIC) that has a circuit configuration dedicatedly designed to perform specific processing.

What is claimed is:

1. An optical scanning device comprising:
   a mirror portion that has a reflecting surface on which an incidence ray is reflected;
   a first actuator that causes the mirror portion to swing around a first axis which is in a plane including the reflecting surface at a time of a standstill of the mirror portion;
   a second actuator that causes the mirror portion to swing around a second axis which is in the plane including the reflecting surface at the time of the standstill of the mirror portion and intersects with the first axis;
   a first angle detection sensor that outputs a signal corresponding to an angle of the mirror portion around the first axis;
   a second angle detection sensor that outputs a signal corresponding to an angle of the mirror portion around the second axis;
   at least one photodetector provided at a position at which reflected light from the mirror portion is receivable; and
   at least one processor,
   wherein the processor is configured to
      provide a first driving signal having a first driving frequency to the first actuator,
      provide a second driving signal having a second driving frequency to the second actuator,
      derive a first shift time that is a shift time used for correcting a generation timing of a first reference signal representing that the angle of the mirror portion around the first axis is equal to a first reference angle, and is a shift time of a point in time when the angle of the mirror portion around the first axis is equal to the first reference angle with respect to a point in time when the output signal of the first angle detection sensor represents that the angle of the mirror portion around the first axis is equal to the first reference angle, based on an output signal of the photodetector, and
      derive a second shift time that is a shift time used for correcting a generation timing of a second reference signal representing that the angle of the mirror portion around the second axis is equal to a second reference angle, and is a shift time of a point in time when the angle of the mirror portion around the second axis is equal to the second reference angle with respect to a point in time when the output signal of the second angle detection sensor represents that the angle of the mirror portion around the second axis is equal to the second reference angle, based on the output signal of the photodetector;
   wherein the processor is configured to
      derive a first average phase delay time by averaging a first phase delay time of the output signal of the first angle detection sensor with respect to the first driving signal in a plurality of cycles, and
      derive a second average phase delay time by averaging a second phase delay time of the output signal of the second angle detection sensor with respect to the second driving signal in a plurality of cycles,
   the point in time when the output signal of the first angle detection sensor represents that the angle of the mirror portion around the first axis is equal to the first reference angle is a point in time after an elapse of the first average phase delay time from a point in time when the first driving signal represents that the angle of the mirror portion around the first axis is equal to the first reference angle, and
   the point in time when the output signal of the second angle detection sensor represents that the angle of the mirror portion around the second axis is equal to the second reference angle is a point in time after an elapse of the second average phase delay time from a point in time when the second driving signal represents that the angle of the mirror portion around the second axis is equal to the second reference angle.

2. The optical scanning device according to claim 1, wherein one photodetector is provided at a center of a region in which an image is drawn by the reflected light from the mirror portion.

3. The optical scanning device according to claim 1, wherein the photodetector is provided on an axis corresponding to the first axis and on an axis corresponding to the second axis in a region in which an image is drawable by the reflected light from the mirror portion.

4. The optical scanning device according to claim 3, wherein at least one photodetector is provided in each end part on the axis corresponding to the first axis and each end part on the axis corresponding to the second axis in the region in which the image is drawable by the reflected light from the mirror portion.

5. The optical scanning device according to claim 1, wherein the processor is configured to
   derive the first average phase delay time by averaging the first phase delay time at a point in time when the output signal of the first angle detection sensor is zero, and
   derive the second average phase delay time by averaging the second phase delay time at a point in time when the output signal of the second angle detection sensor is zero.

6. The optical scanning device according to claim 5, wherein the processor is configured to
   derive the first average phase delay time by averaging the first phase delay time from a point in time when the first driving signal is zero to the point in time when the output signal of the first angle detection sensor is zero in a corresponding cycle, and
   derive the second average phase delay time by averaging the second phase delay time from a point in time when the second driving signal is zero to the point in time when the output signal of the second angle detection sensor is zero in a corresponding cycle.

7. The optical scanning device according to claim 1, wherein the first reference angle and the second reference angle are zero,
the first shift time is a time from a point in time when the output signal of the first angle detection sensor represents that the angle of the mirror portion around the first axis is zero to a point in time when the output signal of the photodetector represents that the angle of the mirror portion around the first axis is zero, and
the second shift time is a time from a point in time when the output signal of the second angle detection sensor represents that the angle of the mirror portion around the second axis is zero to a point in time when the output signal of the photodetector represents that the angle of the mirror portion around the second axis is zero.

8. The optical scanning device according to claim 1, wherein the processor is configured to
generate the first reference signal at a point in time after an elapse of the first shift time from the point in time when the output signal of the first angle detection sensor represents that the angle of the mirror portion around the first axis is equal to the first reference angle, and
generate the second reference signal at a point in time after an elapse of the second shift time from the point in time when the output signal of the second angle detection sensor represents that the angle of the mirror portion around the second axis is equal to the second reference angle.

9. The optical scanning device according to claim 8, wherein a shift time derivation mode in which the first shift time and the second shift time are derived is provided, and
the processor is configured to
acquire the first shift time and the second shift time for each preset condition by executing the shift time derivation mode in calibration, and
use the first shift time and the second shift time acquired in advance in the calibration in generating the first reference signal and the second reference signal.

10. The optical scanning device according to claim 9, wherein the condition includes the first phase delay time and the second phase delay time.

11. The optical scanning device according to claim 10, wherein the condition further includes a driving voltage of the first driving signal and a driving voltage of the second driving signal.

12. The optical scanning device according to claim 10, wherein the condition further includes the first driving frequency and the second driving frequency.

13. The optical scanning device according to claim 10, wherein the condition further includes an ambient temperature.

14. The optical scanning device according to claim 1, wherein the photodetector is a photodiode.

15. The optical scanning device according to claim 1, wherein the photodetector is in a non-driven state during drawing of an image.

16. The optical scanning device according to claim 1, wherein the first angle detection sensor includes a pair of angle detection sensors arranged at positions that face each other with the first axis or the second axis interposed between the positions,
the output signal of the first angle detection sensor is an output signal obtained by adding or subtracting a pair of output signals output from the pair of angle detection sensors,
the second angle detection sensor includes a pair of angle detection sensors arranged at positions that face each other with the first axis or the second axis interposed between the positions, and
the output signal of the second angle detection sensor is an output signal obtained by adding or subtracting a pair of output signals output from the pair of angle detection sensors.

17. An image drawing system comprising:
the optical scanning device according to claim 1; and
a light source that irradiates the mirror portion with light.

18. A driving method of an optical scanning device including a mirror portion that has a reflecting surface on which an incidence ray is reflected, a first actuator that causes the mirror portion to swing around a first axis which is in a plane including the reflecting surface at a time of a standstill of the mirror portion, a second actuator that causes the mirror portion to swing around a second axis which is in the plane including the reflecting surface at the time of the standstill of the mirror portion and intersects with the first axis, a first angle detection sensor that outputs a signal corresponding to an angle of the mirror portion around the first axis, a second angle detection sensor that outputs a signal corresponding to an angle of the mirror portion around the second axis, and at least one photodetector provided at a position at which reflected light from the mirror portion is receivable, the driving method comprising:
providing a first driving signal having a first driving frequency to the first actuator;
providing a second driving signal having a second driving frequency to the second actuator;
deriving a first shift time that is a shift time used for correcting a generation timing of a first reference signal representing that the angle of the mirror portion around the first axis is equal to a first reference angle, and is a shift time of a point in time when the angle of the mirror portion around the first axis is equal to the first reference angle with respect to a point in time when the output signal of the first angle detection sensor represents that the angle of the mirror portion around the first axis is equal to the first reference angle, based on an output signal of the photodetector; and
deriving a second shift time that is a shift time used for correcting a generation timing of a second reference signal representing that the angle of the mirror portion around the second axis is equal to a second reference angle, and is a shift time of a point in time when the angle of the mirror portion around the second axis is equal to the second reference angle with respect to a point in time when the output signal of the second angle detection sensor represents that the angle of the mirror portion around the second axis is equal to the second reference angle, based on the output signal of the photodetector, wherein the driving method
derives a first average phase delay time by averaging a first phase delay time of the output signal of the first angle detection sensor with respect to the first driving signal in a plurality of cycles, and
derives a second average phase delay time by averaging a second phase delay time of the output signal of the second angle detection sensor with respect to the second driving signal in a plurality of cycles, the point in time when the output signal of the first angle detection sensor represents that the angle of the mirror portion around the first axis is equal to the first reference angle is a point in time after an elapse of the first average phase delay time from a point in time when the first driving signal represents that the angle of the mirror portion around the first axis is equal to the first reference angle, and the point in time when the output signal of the second angle detection sensor represents that the angle of the mirror portion around the second axis is equal to the second reference angle is a point in time after an elapse of the second average phase delay time from a point in time when the second driving signal represents that the angle of the mirror portion around the second axis is equal to the second reference angle.

* * * * *